US011793128B2

(12) United States Patent
Kendall

(10) Patent No.: US 11,793,128 B2
(45) Date of Patent: Oct. 24, 2023

(54) IRRIGATION APPARATUS

(71) Applicant: John William Kendall, West Kelowna (CA)

(72) Inventor: John William Kendall, West Kelowna (CA)

( * ) Notice: Subject to any disclaimer, the term of this patent is extended or adjusted under 35 U.S.C. 154(b) by 91 days.

(21) Appl. No.: 17/460,232

(22) Filed: Aug. 29, 2021

(65) Prior Publication Data

US 2023/0067922 A1 Mar. 2, 2023

(51) Int. Cl.
*A01G 25/02* (2006.01)
*A01G 9/02* (2018.01)
*A01G 31/02* (2006.01)

(52) U.S. Cl.
CPC .............. *A01G 25/023* (2013.01); *A01G 9/02* (2013.01); *A01G 31/02* (2013.01)

(58) Field of Classification Search
CPC ........ A01G 25/023; A01G 9/02; A01G 31/02; A01G 27/00; A01G 29/00; A01G 9/124; A01G 9/122

USPC .......................................................... 47/48.5
See application file for complete search history.

(56) References Cited

U.S. PATENT DOCUMENTS

| 4,099,354 | A | * | 7/1978 | DePirro | ................... | E02D 27/42 |
| | | | | | | 52/165 |
| 5,272,835 | A | * | 12/1993 | Stern | ....................... | A01G 27/02 |
| | | | | | | 47/79 |
| 7,080,484 | B2 | * | 7/2006 | Littge | ................... | A01G 27/005 |
| | | | | | | 47/79 |
| 8,857,103 | B1 | * | 10/2014 | Coon | ..................... | A01G 9/124 |
| | | | | | | 47/79 |
| 2018/0125015 | A1 | * | 5/2018 | Marshall | .................. | A01G 9/02 |

* cited by examiner

*Primary Examiner* — Joshua D Huson
*Assistant Examiner* — Spencer T Callaway
(74) *Attorney, Agent, or Firm* — Richard D. Okimaw

(57) ABSTRACT

An irrigation apparatus to water, contain and support plants. The irrigation apparatus comprising a body portion comprised of a top portion and a bottom portion that join to form a liquid containment vessel that disperses liquid in a defined dispersal pattern through angled openings to at least one plant embedded in growth medium at grade or at elevation in a plant growth container.

24 Claims, 29 Drawing Sheets

IRRIGATION APPARATUS

CROSS-REFERENCE TO RELATED APPLICATIONS

Not applicable.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile by anyone of the patent document or patent disclosure as it appears in the Patent and Trademark Office, patent file or records, but otherwise reserves all copyright rights whatsoever.

FIELD OF THE INVENTION

This invention relates to growing plants. To be more specific, this invention pertains to plants growing in gardens, garden containers and commercial agricultural settings inclusive of field farms and hydroponic/aeroponic operations.

BACKGROUND OF THE INVENTION

The following background information may present examples of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that plants, are living multicellular organisms of the kingdom Plantae. They form a clade that includes the flowering plants, conifers and other gymnosperms, ferns, club mosses, hornworts, liverworts, and mosses.

Typically, plant growth is determined by environmental factors, such as temperature, available water, available light, carbon dioxide, and nutrients in a growth medium, such as soil. Any change in the availability of these external conditions will be reflected in the plant's growth. There are biotic factors that are also capable of affecting plant growth. Plants compete with other plants for space, water, light and nutrients, for example. In ground biotic communities are important for plant growth.

There are several methods of watering plants for farm and garden. These methods include in order of efficiency; overhead spray irrigation, in between row flood irrigation, soaker hose irrigation and drip irrigation. Both spray and flood irrigation use an excessive amount of water and create potential for the development of waterborne disease. Drip irrigation is considered the most efficient but is ineffective for watering high-density plantings growing in a single small spot. Further, it's common for emitters spaced along the line to become plugged, which typically kills a plant long before it is noticed in a backyard garden or farmer's field. The undulating nature of large soiled areas where plants grow creates high and low spots at grade, which means plants are not watered evenly using the afore mentioned watering methods and systems; a plant growing in a low spot where water collects will overwater the plant, which will hinder growth and conversely, a plant growing in a high spot may not get watered at all, which would kill the plant. The development of more efficient water delivery system for growing plants both in the garden and on the farm would be desired, particularly when growing plants over undulating farms and gardens in areas of the world where water scarcity is an issue.

There are some watering apparatus that connect to a garden hose to water a garden. These types of apparatus include varieties of sprinkler's that water plants from above. Sprinklers typically water a larger area than is necessary for plants growing in the garden. Watering a single plant growing in a small spot or a small group of plant growing in a small area is virtually impossible. Reducing the flow of water by partially closing the valve of a water supply hose will still overspray a small area where one or more grow. Closing the valve to a trickle may stop the sprinkler from operating entirely.

Plants that grow in containers are typically watered by hand using a water jug of some sort. Where rows of plants are grown in pots commercially, drip irrigation is often used. Watering by hand or drip will be adequate for the short-term growth of a plant such as an annual, which has a life span of only a few months. Perennials however, would quickly become root bound and die. The shape of the container also determines how quickly a plant becomes root bound. Plant pots are cone shaped with a closed bottom and open top, however this shape does not conform to the natural inverted cone shape of a plant. As roots grow down into the progressively smaller space of a cone shaped pot they become root bound.

It is common practice for the entirety of an area to be tilled and fertilized even though only a fraction of the area is used to grow plants. This is a waste of increasingly expensive and valuable resources that include water and fertilizer. Season to season tilling is now believed to be a primary cause of soil degradation around the world. Tilling destroys biotic communities that are beneficial to plants. Continual tilling causes these communities to decline and die out. It would be advantageous to disturb the soil only where each plant grows to stimulate development and continual growth of these beneficial biotic communities.

A wide variety of plant trellises are available to support plants. Some are manufactured using metal and others are fabricated from wood. Virtually all use fasteners to tie portions a plant vertically to the frame of the trellis. Forcing a plant to grow vertically is unnatural to some plants including melons, cucumbers and tomatoes. Vertical horticulture is known to cut fruit production by as much as half for these types of plants and supporting a plant vertically increases the potential for sunscald by exposing fruit to sun. A trellis that would support the natural horizontal growth habit of vining plants would be beneficial.

A common variety of fasteners are available for fastening a ground cover over soil at grade. Known as staples, these "u-shaped" metal pins are pushed by hand through the ground cover material into the soil. Unfortunately, this leaves the punctured openings exposed to the elements so undesirable plants such as weeds will grow through creating more of a mess than was intended.

In view of the foregoing, it is clear that these traditional techniques are not perfect and leave room for more optimal approaches.

In all embodiments of the present invention, water and nutrient is conserved.

In a preferred embodiment of the present invention, an exemplary body portion connects to a liquid delivery conduit. Liquid is conveyed to a liquid containment vessel configured about an aperture at the center of the body portion. Openings structured and arranged about the inner wall of the liquid containment vessel disperses the liquid contained within the vessel to at least one plant that grows within the aperture imbedded in growth medium. The liquid is dispersed in a defined pattern that effectively soaks the medium so one plant or multiples of plants may be grown at the center of the body portion. An external pressure regular configured between the body portion and the liquid delivery conduit ensures that each plant(s) growing within an array of body portions revives more or less an equal amount of the liquid even though there may be differences in elevation between multiples of devices.

Gravity fed water systems have been used for many hundreds of years to move water from one place to another. This system uses the laws of gravity to move water from point A to point B without the use of mechanical pumps. In one embodiment of the present invention, the body portion disperses liquid nutrient using a gravity fed system to convey liquid to the liquid containment vessel, which disperses liquid to at least one plant that grows within an aperture at the center of the body portion.

Spacing exemplary body portions along a flexible liquid conduit would be advantageous for growing plants around obstacles or to surround obstacles or to grow plants of particular design or pattern that features a curve or curves.

Arranging an array of body portions in a circle can also form a letter of an alphabet; form a number or form a symbol. In one embodiment of the present invention show in FIG. 1R, the array spells out the letter "O" of the English alphabet or the number "0" with growing plants.

Spacing exemplary body portions along a flexible liquid conduit also allows plants to be grown in straight line or around a corner.

In one embodiment of the present invention, an internal pressure regulator inserts into an exemplary washer portion placed within a double female swivel hose fitting to reduce pressure at the body portion instead of the use of a valve configured at a supply end of a hose. In this way, a controlled amount of water is delivered to each of the plant(s) growing at the center of the body portion without the need for ineffective pressure adjustments at the supply end of the hose.

In a preferred embodiment of the present invention, a funnel shaped aperture cavity inserts into a cavity portion excavated by hand or by mechanical means in earth and/or soil below grade. Filling the bottom portion of the cavity with enriched manure provides fertilized nutrient to the plant(s). Filling the approximate center of the cavity with secondary types of nutrient such as kelp extract, Epson slats or volcanic ash on top of growth medium that covers the enriched manure will further assist a plant(s) ability to grow, fruit and flower.

Filling excavated cavities with a nutrient rich soil is an exemplary targeted agricultural system that is beneficial for both plants and soil. Only a fraction of the nutrient used for tilled soil operations is required saving both time and money. Using less fertilizer means that fewer polluting phosphates will end up in the water supply. Only the targeted areas are cavitated leaving the bulk of the land area free for the development of beneficial subterranean biotic communities.

In a preferred embodiment of the present invention, the cavity is cone shaped to mimic the natural shape of the roots of a plant(s). Shaping the cavity by hand or mechanical means into a cone provides additional space for nutrient rich soil and room for plant roots to grow, which improves plant health and productivity.

In another embodiment of the present invention, a ground cover is laid out over grade to prevent weed growth. The funnel shaped aperture cavity inserts through an opening fashioned in the ground cover before imbedding within the cavity that is filled with growth medium and nutrient. The ground cover also blocks the sun and retains moisture, which is a benefit to biotic communities that build within soil below the cover. The sun can scorch exposed soil during the hot summer months. Exposed soil that is allowed to bake in the sun will harden and become almost impenetrable by irrigation or rainfall. A hardened, dry soil will not support much of a biotic community if any at all.

Fashioning slits about the opening fashioned in the ground cover allows a plant with attached roots to be pulled easily from the earthen cavity. Slits fashioned in the four cardinal directions for example, create four flaps that will fold back out of the way as the root of a plant is pulled up out from the cavity and through the opening without disturbing the surrounding ground cover.

In one embodiment of the present invention, an exemplary body portion joins with an exemplary container portion. The container portion is shaped to mimic the natural growth habit of the roots of a plant deferring the potential for root bound for several years, which makes the exemplary container portion ideal for perennials including landscape plants and trees. The body portion efficiently disperses liquid to one or more plants that grow in the container.

In one embodiment of the present invention, a waterproof adhesive is applied to the underside (203) of a cavity that encompasses the bottom end of the container portion to create a watertight seal after placement on top of a solid or semi solid substrate such as a plywood or rubberized ground cover, for example. The adhesive prevents plant roots from penetrating the seal and growing outside the confines of the container portion. Without the seal, liquid would leak out from under the perimeter of the container portion, which plant roots would follow in search of nutrient.

In one embodiment of the present invention, an exemplary body portion joins with an exemplary plant support. A generally planar horizontal support portion joins with a hollowed vertical tunnel portion to elevate the flowering and fruiting portions of a plant above ground. Elevated plant portions receive the maximum amount of sunlight as the sun tracks across the sky throughout the day. The large disk shape of the horizontal support portion provides an adequate surface for the vines of plants to grow as they would over the ground in the natural environment. This is particularly advantageous for vining plants like tomatoes, melons and cucumbers. This also eliminates the need to fasten plant portions to the frame of the exemplary plant support with plant ties.

A plant that grows over an elevated disk allows ambient air to flow under the vines in close proximity to the root allowing oxygen to permeate the soil, which is a benefit to the plant. At grade, fruit that grows near the stem of the plant are susceptible to crush from initial heavy, thick branches that grow above it. As the branches bear fruit, their weight bears down on the fruit underneath making the fruit difficult to harvest.

Branching is minimized over fruit that forms close to the main stem of the plant on top of the disk due to the fact that the initial heavy, thick branching that occurs early in a plants life happens mostly within the tunnel portion under the disk leaving the lighter, thinner branches to grow over the disk and bear fruit.

In one embodiment of the present invention, a soilless substrate that may include lava rocks, perlite, expanded clay pebbles, coco coir or peat moss fill the funnel shape aperture cavity configured at the center of the body portion. At least one plant grows within the substrate, which is watered and fertilized with a liquid nutrient dispersed pluralities of openings spaced about the inner wall of the liquid containment chamber configured about the body portion aperture.

In yet another embodiment of the present invention, the body portion funnel shaped aperture cavity inserts into a stone or rockwool substrate that is typically cubed. Also referred to as grow blocks, grow cubes and grow slabs, these cubed substrates come in a variety of sizes determined by predicted root size of the plant(s) and are used by commercial greenhouses, indoor farms, hydroponic facilities, vertical farms, and other types of CEA facilities. A secondary soilless substrate fills the funnel shaped aperture after insertion into the grow block, which is watered and fertilized with a liquid nutrient dispersed pluralities of openings spaced about the inner wall of the liquid containment chamber configured about the body portion aperture.

In another embodiment of the present invention, an exemplary fastener portion holds a ground cover in place at grade. The fastener portion configuration facilitates easy removal and prevents undesirable plant growth at the installation site.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A illustrates a detailed perspective view of an exemplary body portion showing an aperture configured at the center, FIG. 1B illustrates a detailed exploded view of an exemplary top portion above an exemplary bottom portion, FIG. 1C illustrates a detailed sectioned view of an exemplary body portion showing the exemplary top portion joined with the exemplary bottom portion forming an exemplary liquid containment vessel, FIG. 1D illustrates a detailed perspective view of the exemplary top section showing liquid dispersal openings spaced about the inner sidewall, FIG. 1E illustrates a detailed perspective view of the exemplary top half showing the cavity configured below the surface of the top portion, FIG. 1F illustrates a detailed perspective view of an exemplary bottom portion showing an aperture configured at the center, FIG. 1G illustrates a detailed side view of an exemplary bottom portion showing the funnel shaped aperture cavity configured below the planar bottom portion, FIG. 1H illustrates a detailed sectioned view of the exemplary inner sidewall showing a set of three openings configured to disperse liquid at an angle, FIG. 1I illustrates a top view of an exemplary top portion showing an exemplary defined liquid dispersal pattern to be dispersed within the body portion aperture, FIG. 1J illustrates a detailed side sectioned view of an exemplary body portion showing liquid contained within the liquid containment vessel dispersing from the partially sealed join between the top portion inner wall and the bottom portion inner stub wall, FIG. 1K illustrates a detailed exploded view of an exemplary body portion showing the top portion cavity walls and the bottom portion cavity walls configured for rotational insertion; one into the other, FIG. 1L illustrates a detailed top view of a body portion connected to a flexible liquid conveyance conduit by a length of conduit tubing, FIG. 1M illustrates a detailed top view of a series of body portions connected to a flexible liquid conveyance conduit by two individual lengths of conduit tubing, FIG. 1N illustrates a detailed sectioned view of a cavity fashioned in earth and/or soil at grade filled with nutrient, FIG. 1O illustrates a detailed sectioned view of at least one plant imbedded in growth medium contained by bottom portion funnel shaped cavity imbedded in a cavity fashioned below grade, FIG. 1P illustrates a detailed top view of a plurality of body portions structured and arranged along the curvature of a flexible liquid conveyance conduit, FIG. 1Q illustrates a detailed top view of a plurality of body portions structured and arranged along a flexible liquid conveyance conduit formed in the shape of a circle, FIG. 1R illustrates a detailed top view of a plurality of plants growing within a plurality body portions structured and arranged along a flexible liquid conveyance conduit formed in the shape of the letter "o" of the English alphabet growing plants, FIG. 1S illustrates a detailed top view of pluralities of body portions connected along a flexible liquid conveyance conduit structured and arranged in the shape of a spiral, FIG. 1T illustrates a detailed top view of pluralities of body portions structured and arranged along two separate but concentricity connected circle shaped liquid conveyance conduits, FIG. 1U illustrates a detailed sectioned view of an exemplary plant trellis joined with an exemplary body portion, FIG. 1V illustrates a detailed top view of an exemplary body portion showing an outline of a three leg plant support and an outline of a four leg plant support disposed for insertion into pluralities of corresponding tabs spaced about the top portion, FIG. 1W shows a detailed perspective view of a body portion joined with a container portion, and FIG. 1X illustrates a detailed perspective view of a plant support portion joined with a body portion joined with a container portion showing the legs of the support portion inserted through openings configured in the container portion sidewall, in accordance with an embodiment of the present invention.

FIG. 3A illustrates a detailed exploded side view of an exemplary liquid containment vessel receptacle, a washer, a fitting, a washer portion, an internal pressure regulator and the receptacle end of a hose or pipe, FIG. 3B illustrates a detailed perspective view of an exemplary washer portion showing a first indentation and a second indentation configured within the first indentation for insertion of an internal pressure regulator, and FIG. 3C illustrates a detailed side view of the internal pressure regulator positioned for insertion into a sectioned view of the exemplary washer portion, in accordance with an embodiment of the present invention.

Figure 1A:
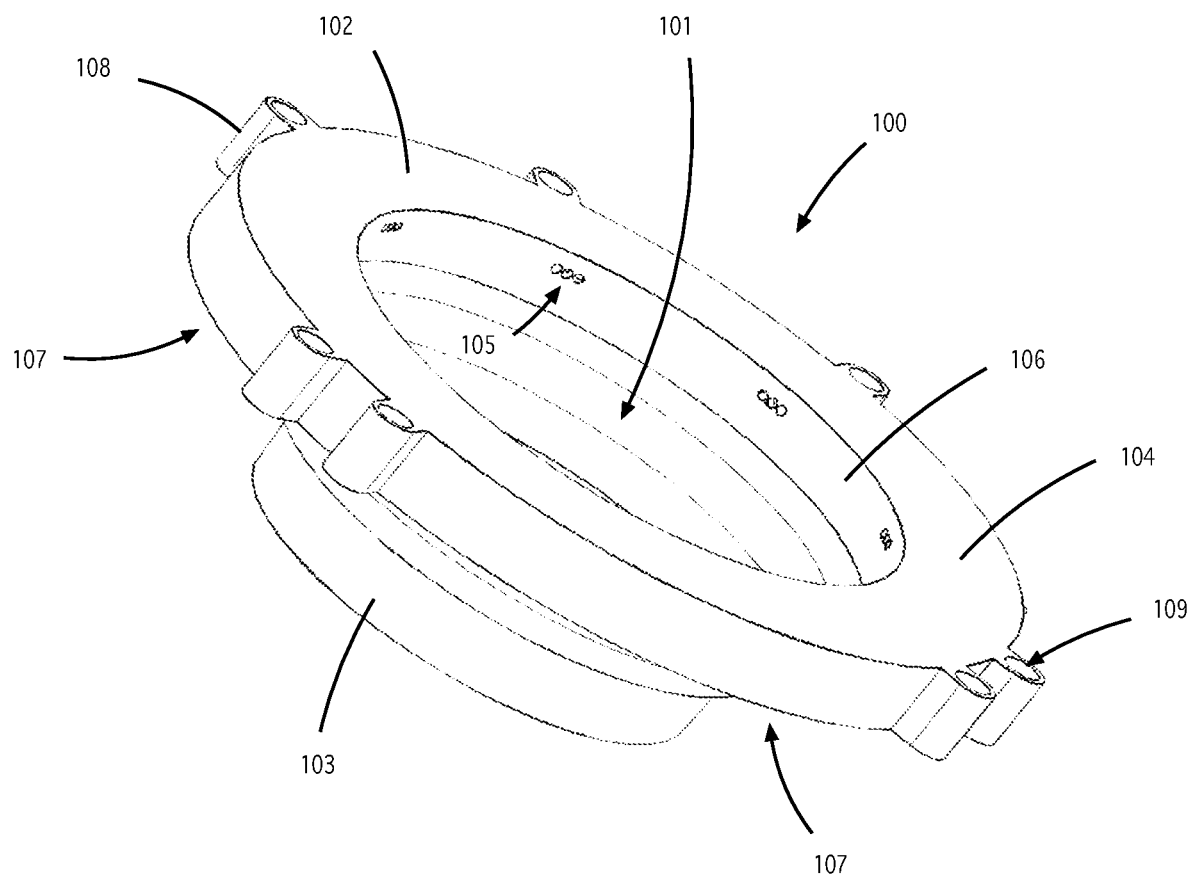
FIGS. 1A, 1B, 1C, 1D, 1E, 1F, 1G, 1H, 1I, 1J, 1K, 1L, 1M, 1N, 1O, 1P, 1Q, 1R, 1S, 1T, 1U, 1V, 1W and 1X illustrate various views of an exemplary irrigation apparatus, where

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated referencing this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features that are described in the context of separate embodiments may also be provided in combination in a single embodiment. Conversely, various features that are, for brevity, described in the context of a single embodiment, may also be provided separately or in any suitable subcombination. The Applicant hereby gives notice that new Claims may be formulated to such features and/or combinations of such features during the prosecution of the present Application or of any further Application derived therefrom.

References to "one embodiment," "some embodiments," "another embodiment," "yet another embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in a preferred embodiment," or "in another embodiment," "in yet another embodiment," or "preferred embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

A number may be defined as an arithmetical value, expressed by a word, symbol, or figure, representing a particular quantity and used in counting and making calculations and for showing order in a series or for identification.

The terms "a", "an" and "the" mean "one or more", unless expressly specified otherwise.

Elements of the invention, for example, a body portion, a top portion, a bottom portion, a top section, a bottom section, a liquid containment vessel, a washer portion, a plant support and an array of body portions and/or plant support portions that are in at least general communication with each other need not be in continuous communication with each other, unless expressly specified otherwise. In addition, elements that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), method(s), or step(s) of the teachings related to any described embodiment of the present invention may be suitably omitted, included, adapted, mixed and matched, or and/or optimized by those skilled in the art, using their average skills and known techniques, to achieve the desired implementation that addresses the needs of the particular application.

The present invention will now be described in detail with reference to embodiments thereof as illustrated in the accompanying drawings.

Liquid may include water and/or nutrient.

Grade typically refers to the top surface of a growth medium contained within a plant growth container or earth and/or soil at ground level.

A plant growth container typically comprises a plant pot having an open top, tapered sides and a closed or open bottom filled with a growth medium to grow plant(s) where at least one plant comprises a seed and/or organism, and/or leaf, and/or a stem, and/or a root.

In at least one embodiment of the present invention, the irrigation apparatus may enable at least one organism to grow in a substantially vertical orientation, horizontally or at an angle. The at least one organism may include one type or multiple types of plant(s), including, without limitation, a vegetative plant, a vegetable, a house plant, a vine, and/or bacteria.

The irrigation apparatus may enable the growth of an organism in a growing medium that may include natural or manmade soil such as mineral wool or coconut fiber.

The irrigation apparatus may be configured to grow plants in a soilless environment using water-based solutions commonly utilized by hydroponic(s) or aeroponic(s) systems.

Wick hydroponic systems suspend a plant above a liquid nutrient solution contained within a reservoir. The plants "wick" water from a liquid absorbent material that inserts into the funnel shaped aperture cavity at the center of the body portion. The liquid containment vessel configured about the funnel shaped cavity aperture disperses liquid to soak the insert. Roots of the plant(s) grow throughout the insert and descend into the liquid solution held by the reservoir that provides nutrient to the plant(s). An air bubbler at the bottom of the reservoir provides oxygen for the plant, which enhances growth. The improved functionality of the irrigation apparatus permits the hydroponic propagation of more than one plant when typically, only one plant can be grown.

Several body portions may be connected; one to the other in series, using one or more liquid delivery hoses, distribution hubs, fittings and/or pipes.

FIGS. 1A, 1B, 1C, 1D, 1E, 1F, 1G, 1H, 1I, 1J, 1K, 1L, 1M, 1N, 1O, 1P, 1Q, 1R, 1S, 1T, 1U, 1V and 1W illustrate various views of an exemplary body portion (100), in accordance with an embodiment of the present invention.

FIG. 1A illustrates a detailed perspective view of an embodiment of an exemplary body portion (100).

The body portion inserts into growth medium contained within a plant growth container or earth and/or soil at grade at least partially. An aperture (101) configured at the center of the body portion comprising a top portion (102) and a bottom portion (103) is partially filled with a growing medium to grow at least one plant.

A watertight chamber (104) shown configured about the aperture provides liquid nutrient to the at least one plant through sets of outlets (105) spaced about an inner cavity sidewall (106).

Joining the top portion and the bottom portion together forms a flange (107) about the device that holds a ground cover in place at grade.

Pluralities of tabs (108) with openings (109) extend out from the body portion for insertion of at least three legs of a plant support or at least one fastener.

Figure 1B:
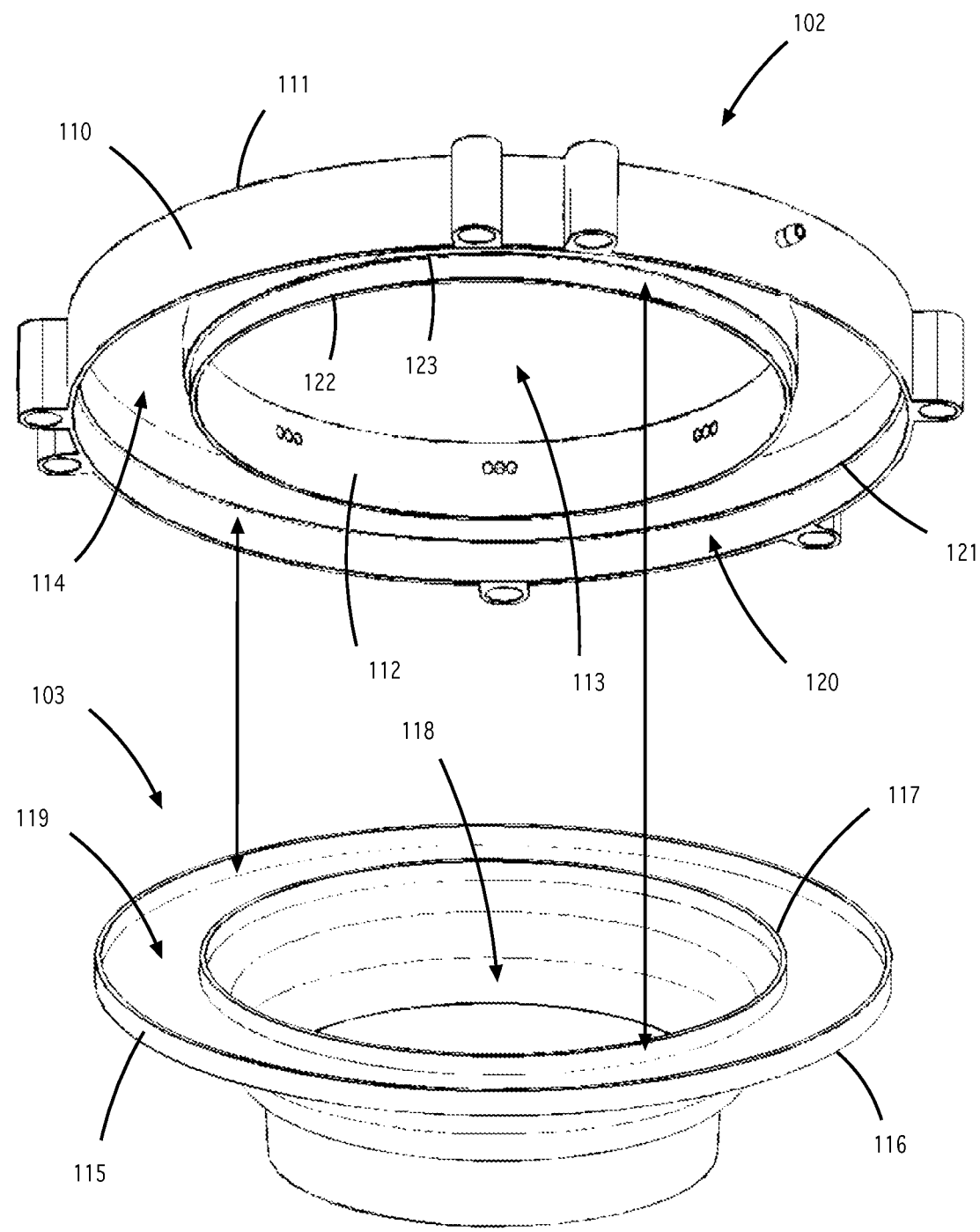

FIG. 1B shows an exploded view of a top portion (102) above a bottom portion (103) positioned to connect and join together to form the body portion.

An outer sidewall (110) configured about the perimeter edge (111) of the top portion and an inner sidewall (112) configured about the aperture (113) at the center of the top portion form a top portion cavity (114).

An outer stub wall (115) configured about the perimeter edge (116) of the bottom portion and an inner stub wall (117) configured about the aperture (118) at the center of the bottom portion form a bottom portion cavity (119).

A notch (120) shown configured about the lower edge (121) of the top portion outer sidewall is configured for insertion of the bottom portion outer stub wall. Using a water proof adhesive to join the outer sidewall to the outer stub wall creates a watertight seal and forms the outer wall of the liquid containment vessel.

A notch (122) shown configured about the lower edge (123) of the top portion inner sidewall is configured for insertion of the bottom portion inner stub wall. Using a water proof adhesive to join the inner sidewall to the inner stub wall creates a watertight seal and forms the inner wall of the liquid containment vessel.

Joining the top portion cavity to the bottom portion cavity together with a waterproof adhesive with adhesive forms the liquid containment vessel with a watertight chamber.

Figure 1C:
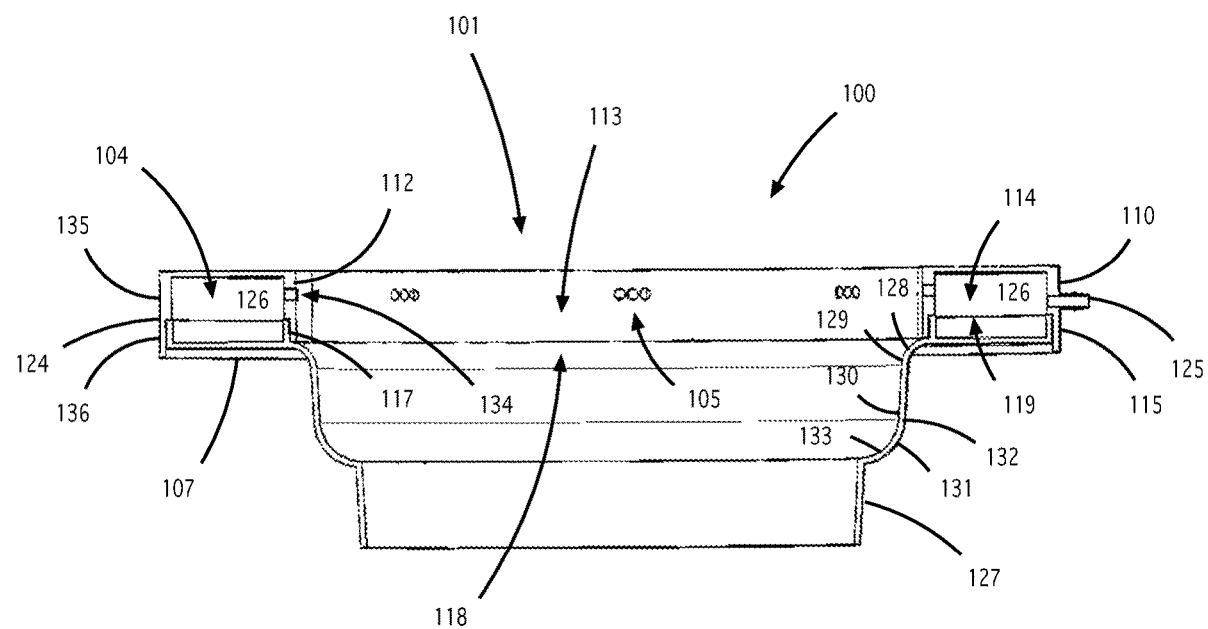

FIG. 1C shows a sectioned side view of an embodiment of the exemplary body portion (100).

The sealed liquid containment vessel (104) is shown configured about the body portion aperture (101).

The liquid containment vessel comprises a top section (135), hereinafter the top portion cavity, and a bottom section (136), hereinafter the bottom portion cavity, which join together.

The top portion cavity (114) comprises an outer sidewall (110) configured about the circumference of the top portion disk and an inner sidewall (112) configured about the top portion aperture (113).

The bottom portion cavity (119) comprises an outer stub wall (115) configured about the circumference of the top portion disk and an inner stub wall (117) configured about the bottom portion aperture (118).

The outer wall of the liquid containment vessel (124) is configured with an inlet (125) to fill the liquid containment vessel interior chamber with liquid (126).

The liquid containment chamber is disposed to be continuously filled with liquid to beyond capacity to increase pressure within the vessel to push the liquid simultaneously through sets of outlets (105) configured with openings (134) shown spaced about the top portion inner sidewall (112).

A funnel shaped cavity aperture (127) configured about the planar disk bottom portion aperture is shown at the center of the body portion. The funnel shaped cavity aperture is configured with two slopes and three walls that convey the liquid to at least one plant imbedded in growth medium contained by the funnel shaped cavity aperture.

The first wall (128) configured about the bottom portion aperture (118) creates the first slope (129) of the funnel shaped cavity aperture. The first wall is curved or sloped to direct a portion of the liquid dispersed by the top portion to the at least one plant embedded in growth medium at the center of the body portion.

The second wall (130) joins the first wall (128) to the third wall (131) configured about the lower most edge (132) of the second wall.

The third wall creates the second slope (133) of the funnel shaped cavity aperture. The third wall is curved or sloped to direct a portion of the liquid dispersed by the first slope to the root of the at least one plant embedded in growth medium at the approximate center of the body portion.

Also shown is the flange (107) configured about the device that holds a ground cover in place at grade.

Figure 1D:
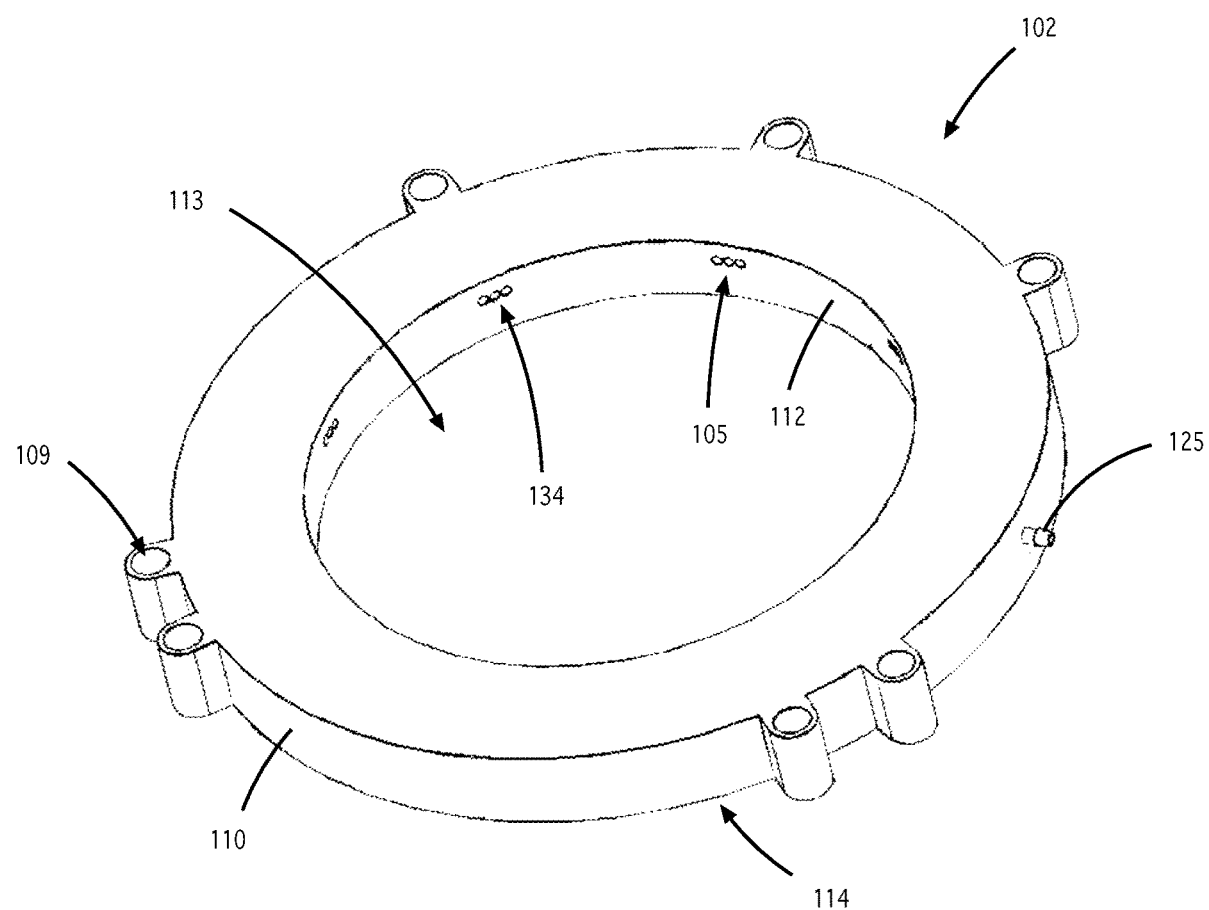

FIG. 1D shows a perspective top view of an embodiment of the exemplary top portion (102).

The aperture (113) shown at the center of the planar disk permits the pass through of plants and portions of plants that grow out from the center of the body portion.

The top portion cavity (114) configured below the disk forms the top section of the liquid containment vessel. An outer sidewall (110) forms the perimeter wall of the cavity and an inner sidewall (112) forms the interior wall of the cavity.

The outer sidewall is configured with an inlet (125) for attachment of a length of conduit tubing used to fill the containment vessel with liquid.

Sets of outlets (105) comprised of openings (134) are shown spaced about the top portion inner sidewall. The openings disperse liquid more or less equally from the liquid containment vessel to the at least one plant that propagates at the center of the body portion.

Pluralities of tabs (108) are shown extending out from the outer sidewall. An opening (109) configured in each tab permits insertion of a leg of a plant support.

Figure 1E:
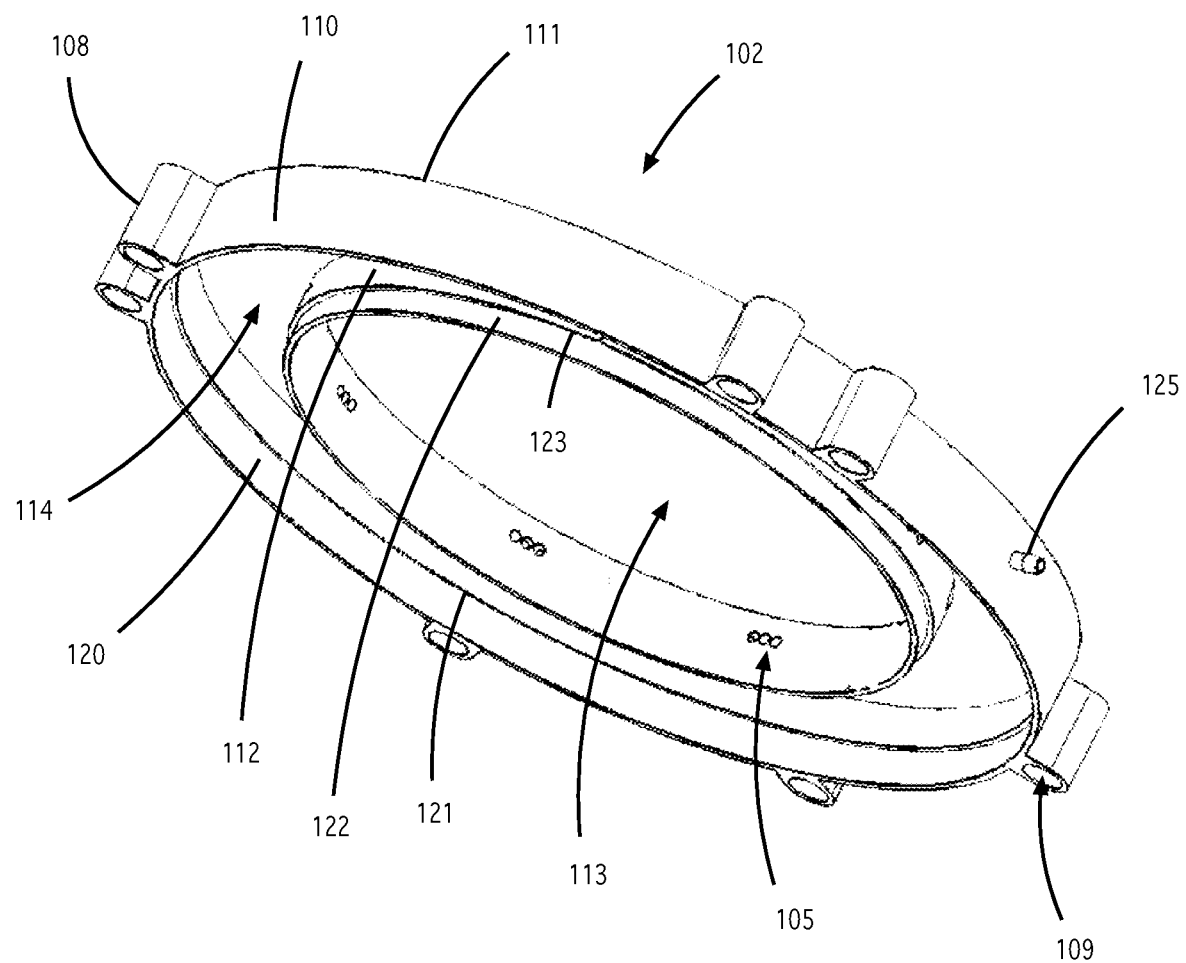

FIG. 1E shows a perspective bottom view of an embodiment of the exemplary top portion (102).

The top portion cavity (114) that forms the top section of the liquid containment vessel is shown.

The outer sidewall (110) configured about the top portion perimeter (111) and the inner sidewall (112) configured about the top portion aperture (113) form the top portion cavity.

Sets of outlets (105) are shown spaced a distance apart to create a defined dispersal pattern to more or less soak the growth medium evenly and undisturbed.

A notch (120) configured about the lower edge (121) of the top portion outer sidewall (110) is shown that is configured to inserts into a bottom portion outer stub wall.

A notch (122) configured about the lower edge (123) of the top portion inner sidewall (112) that is configured for insertion of a bottom portion inner stub wall is also shown.

The inlet (125) configured in the outer sidewall is for attachment of a length of conduit tubing used to fill the containment vessel with liquid.

Pluralities of tabs (108) are shown extending out from the outer sidewall. An opening (109) configured in each tab permits insertion of a leg of a plant support.

Figure 1F:
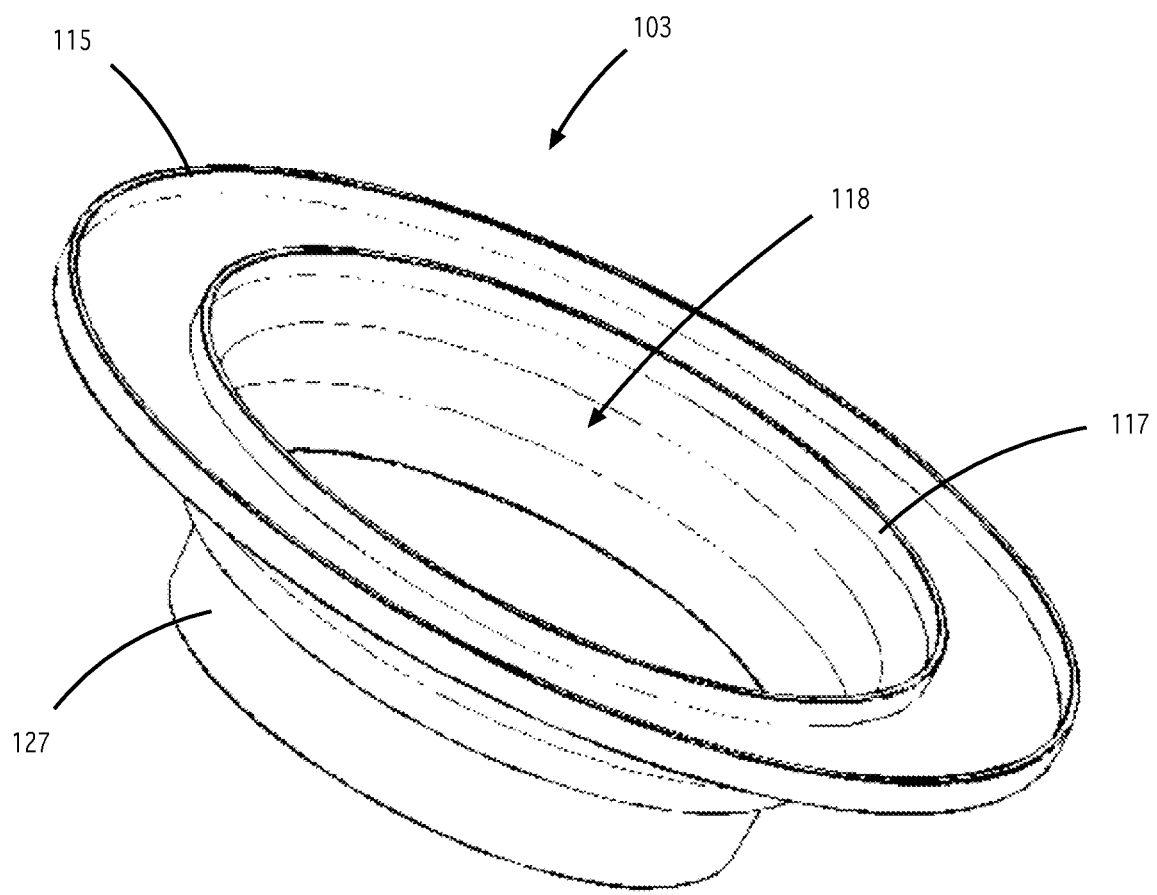

FIG. 1F shows a perspective view of an embodiment of the exemplary bottom portion (103).

The bottom portion is shown having an aperture (118) configured at the center of a circle shaped planar disk.

A funnel shaped cavity aperture (127) is shown configured below the planar disk.

The inner stub wall (117) that forms the inner wall of the bottom section of the liquid containment vessel is shown configured about the planar disk.

The outer stub wall (115) that forms the outer wall of the bottom section of the liquid containment vessel is shown configured about the aperture (118) at the center of the planar disk.

Figure 1G:
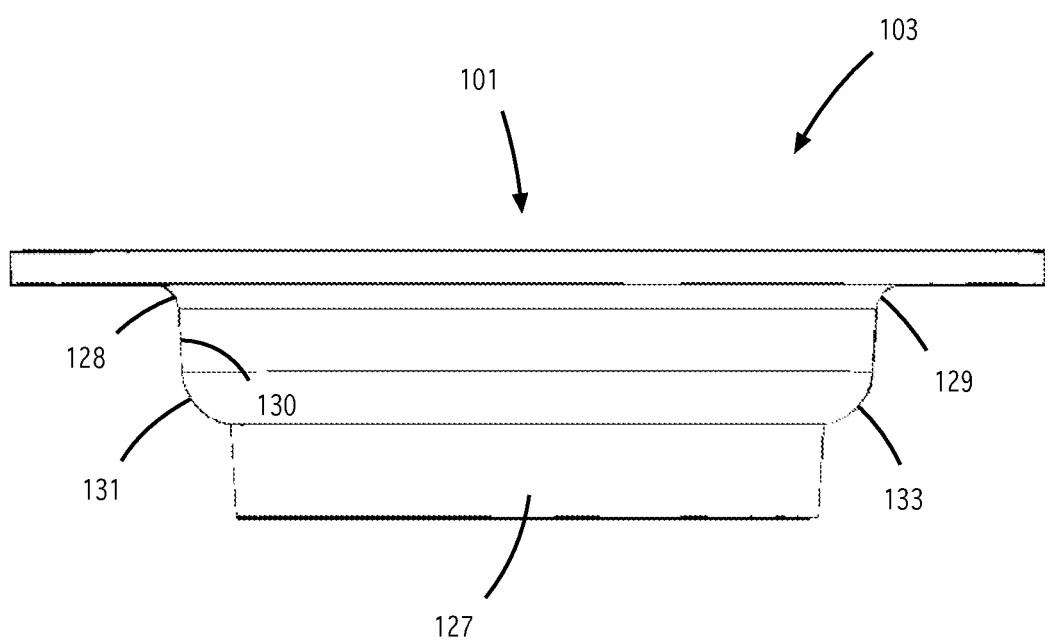

FIG. 1G illustrates a side view of an embodiment of the exemplary bottom portion (103) showing the funnel shaped cavity aperture (127) configured below the planar bottom portion disk.

The funnel shaped cavity aperture has three walls and two slopes that direct portions of liquid dispersed from the top portion outlets to at least one plant embedded in growth medium contained within the funnel shaped cavity aperture.

The first slope (129) is comprised of a curved or sloped first wall (128) that directs a flow of liquid to the at least one plant that grows in growth medium contained within the funnel shaped cavity aperture.

A second wall (130) connects to a second slope (133) that is comprised of a curved or sloped third wall (131) that directs a flow of liquid to the root of the at least one plant.

Figure 1H:
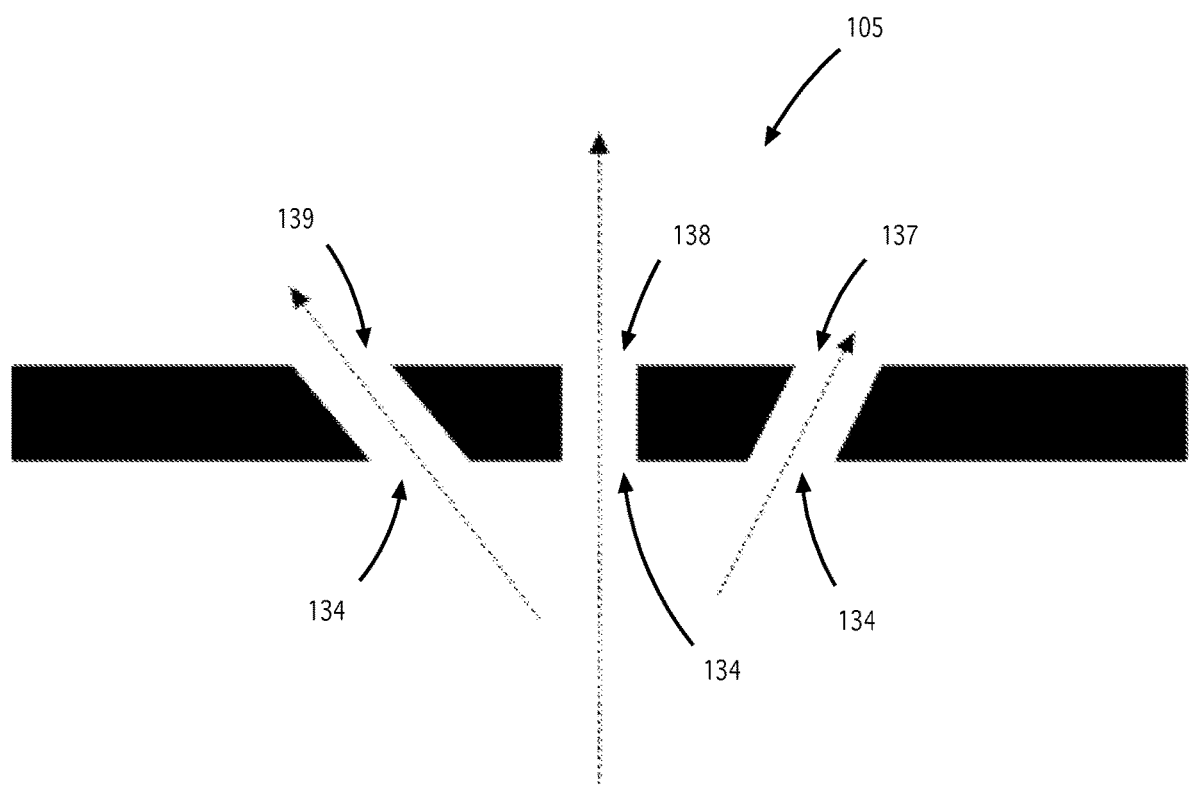

FIG. 1H illustrates a sectioned view of an embodiment of the exemplary set of outlets (105) showing exemplary openings (134).

To create the defined liquid dispersal pattern within the body portion aperture, a first opening (137) adjacent to a second opening (138) is configured at an angle of 22.5 degrees. The second opening adjacent to the first opening is configured at an angle of 90 degrees A third opening (139) adjacent to the second opening is configured at an angle of 45 degrees.

Openings disperse liquid from the liquid containment vessel in a descending low arc pattern towards the interior of the body portion above a growth medium contained within the bottom portion funnel shaped cavity aperture.

Figure 1I:
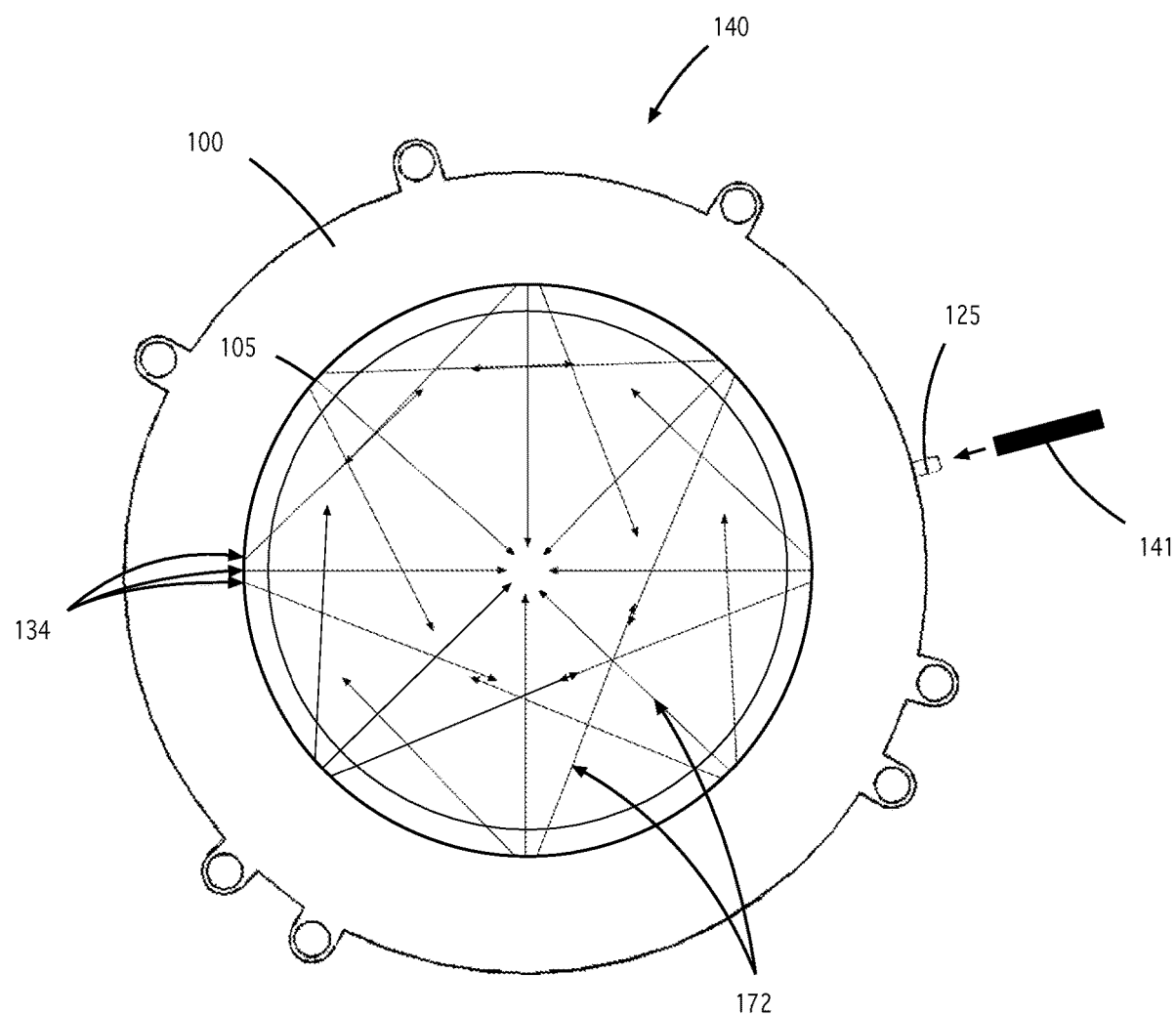

FIG. 1I shows a top view of the exemplary defined liquid dispersal pattern (140).

In a preferred embodiment, eight sets of outlets (105) disperse predictable streams of liquid through twenty-four angled openings (134).

A number of the streams (172) come into contact with one another due to the orientation of the openings. Contact between streams splash liquid against one another to create a gentle water drop effect that gently soaks the growth medium below minimizing the potential for single spot erosion caused by one or more streams consistently delivering liquid to one spot.

A length of conduit tubing (141) is shown positioned to connect with the top portion outer sidewall inlet (125).

Figure 1J:
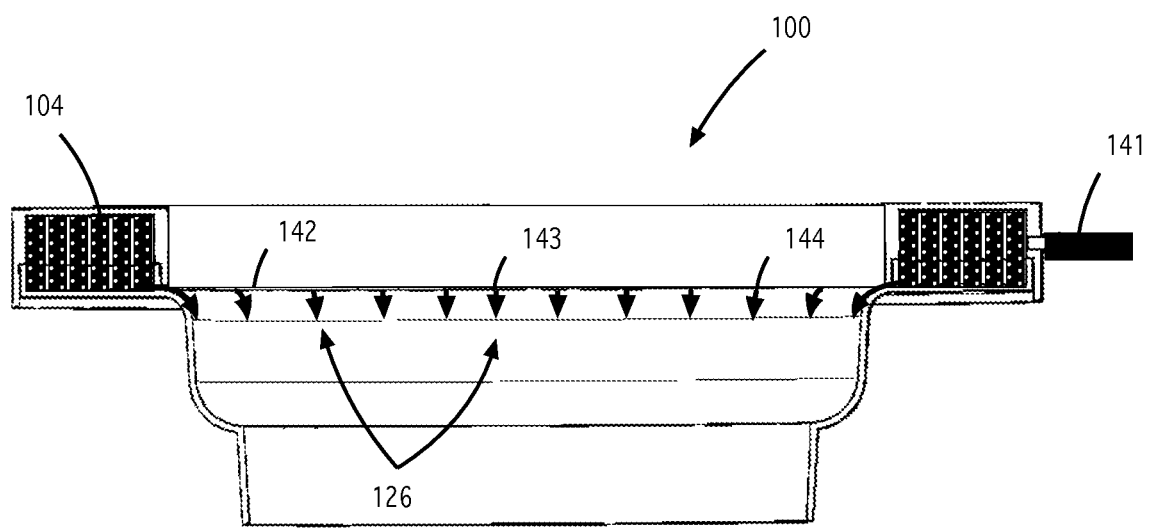

FIG. 1J illustrates a sectioned view of an embodiment of the exemplary body portion (100) showing liquid (126) dispersed from the liquid containment vessel (104) through a partially sealed liquid containment vessel inner wall (142).

Not applying adhesive to an inner stub wall inserted into the notch configured at the lower end of the top portion inner wall creates a join with only a partial seal (143).

Once the liquid containment vessel is full of liquid it begins to pressurize from a continued conveyance of liquid through the conduit tubing. As the pressure increases the liquid leaks (144) from the partially sealed vessel wall more or less equally about the body portion (100) aperture.

A length of conduit tubing (141) connected to the top portion outer sidewall inlet is shown.

Figure 1K:
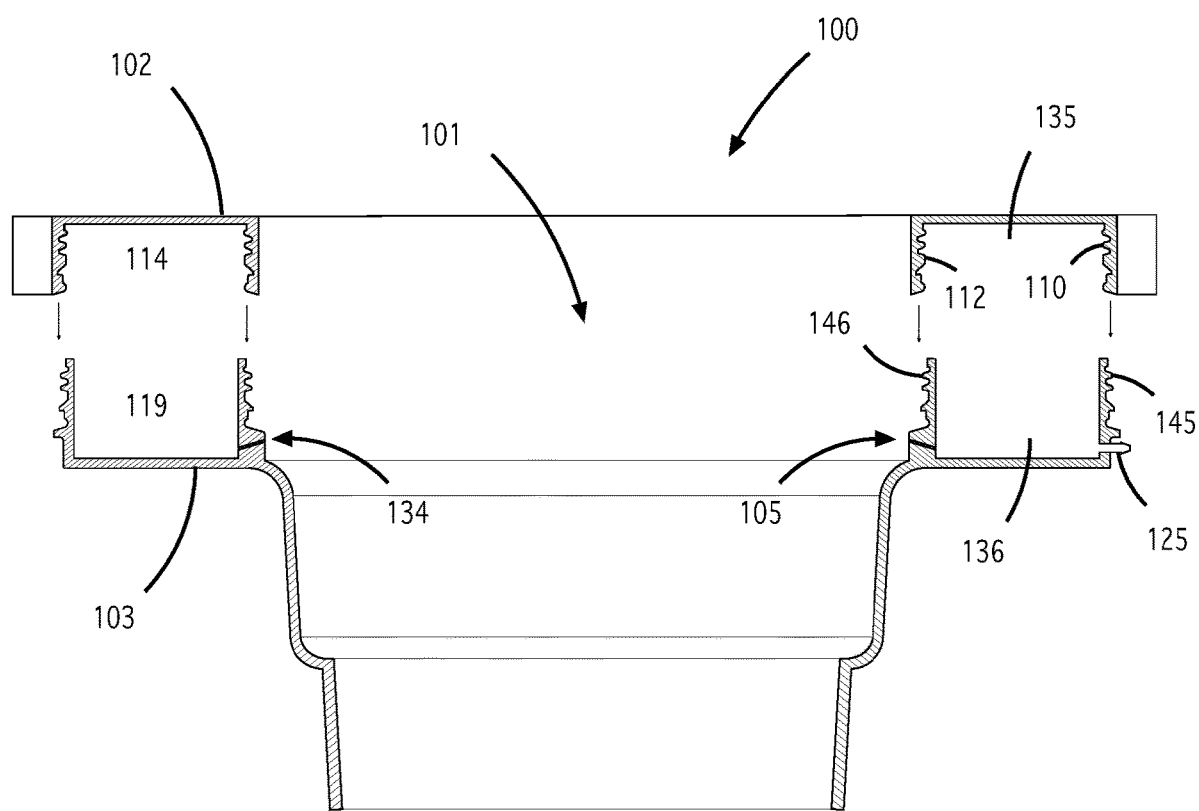

FIG. 1K illustrates an exploded view of a preferred embodiment of the body portion (100) comprising a top portion (102) and a bottom portion (103) configured to rotationally attach to one another.

A sectioned view shows the top portion positioned above the bottom portion before attachment. A top portion cavity (114) is configured below the top portion and a bottom portion cavity (119) is configured above the bottom portion.

The inside circumference of the outer wall (110) of the top portion cavity (114) is threaded for rotational insertion into a correspondingly threaded outside circumference of an outer wall (145) of the bottom portion cavity (119) and similarly, the inside circumference of the inner wall (112) of the top portion cavity (114) is threaded for rotational insertion into a correspondingly threaded outside circumference of an inner wall (146) of the bottom portion cavity (119).

The joining of the two cavities provides a watertight seal for a liquid containment vessel structured and arranged about the aperture (101) configured at the center of the body portion (100).

The top portion cavity forms the top section (135) of the liquid containment vessel and the bottom portion cavity forms the bottom section (136) of the liquid containment vessel.

A threaded seal increases the pressure per square inch (PSI) that can be contained by the liquid containment vessel. The liquid containment vessel using a threaded seal using a GPI (Glass Packaging Institute) or (SPI Society of the Plastics Industry) finish will hold up to 15 PSI before leaking, for example.

However, a threaded seal using a PCO (Plastic Closure Only)—1881 finish commonly used for plastic soda pop bottles will hold a pressure of up to 75 PSI before leaking. Alternatively, a GHT thread typically used for garden hose connections or an NPT threading commonly used for pipe connections may be used as well.

The thread chosen will depend on the PSI of a flexible conduit liquid supply line and/or the use and rating of an external pressure reducer installed between the supply line and the body portion.

Sets of outlets (105) are structured and arranged around the inner stub wall of the bottom portion.

In a preferred embodiment, eight sets of outlets disperse predictable streams of liquid through twenty-four angled openings (134) that slope upward at an angle of at least 15 degrees towards the center of the bottom portion aperture.

Openings disperse liquid from the liquid containment vessel in a descending high arc pattern towards the interior of the body portion above a growth medium contained within the bottom portion funnel shaped cavity aperture.

A number of the streams come into contact with one another due to the orientation of the openings. Contact between streams splash against one another creating a gentle water drop effect that soaks the growth medium below thereby minimizing the potential for single spot erosion caused by one or more streams consistently delivering liquid to that one spot.

An inlet (125) for attachment of a length of conduit tubing is shown configured at the bottom portion outer stub wall to convey liquid to the interior of the liquid containment vessel.

Figure 1L:
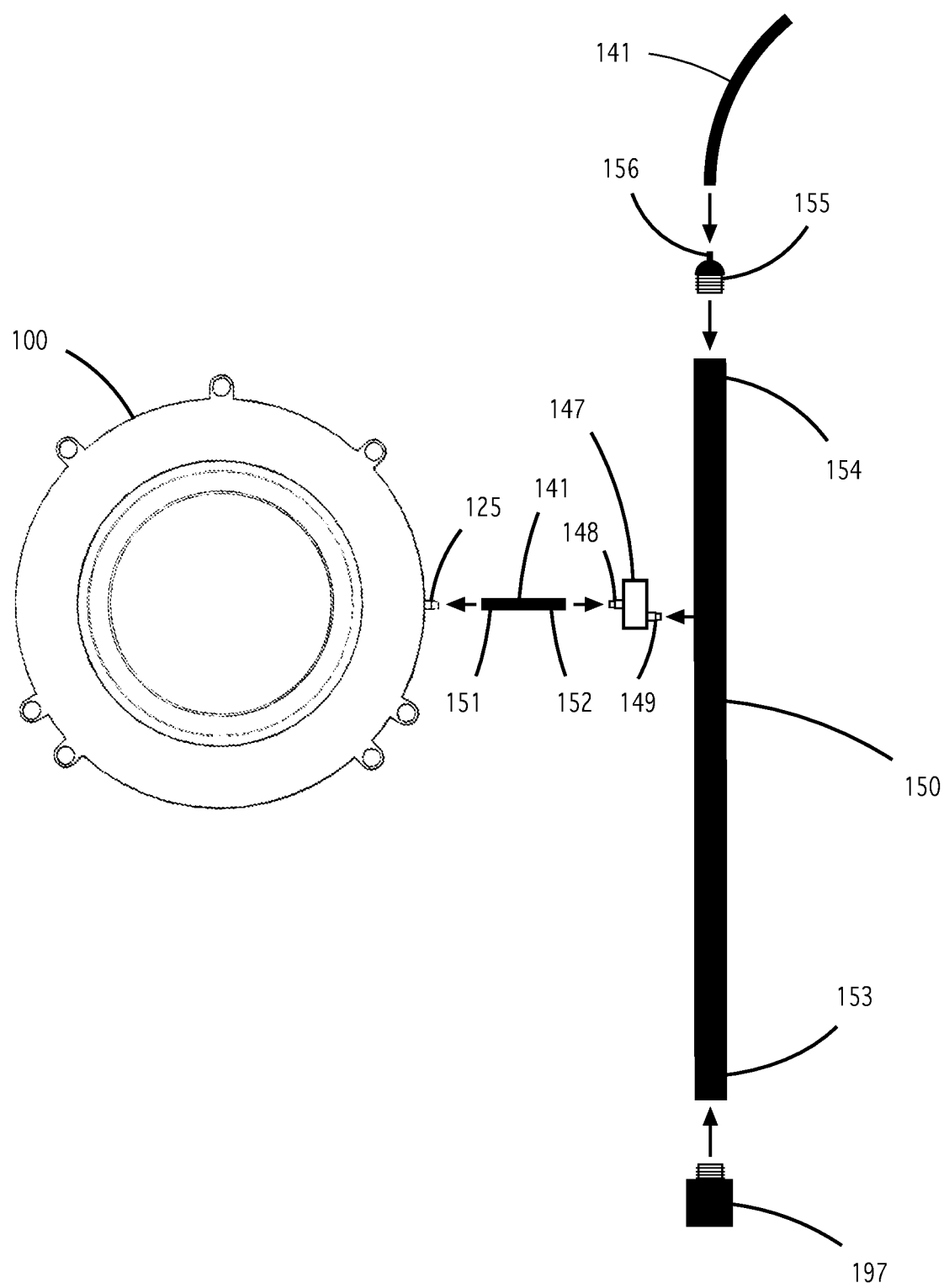

FIG. 1L illustrates an exploded view an exemplary body portion (100), a length of conduit tubing (141) having two ends, an external pressure regulator (147) configured with an outlet (148) and an inlet (149) and a length of flexible liquid conduit (150) also having two ends; the one end (153) and the other end (154).

The top view shows the body portion (100) vessel inlet (125) positioned for attachment and connection to one end (151) of the length of conduit tubing (141).

The other end (152) of the length of liquid conduit tubing is shown positioned for attachment and connection to the external pressure regulator (147) outlet (148), which is also shown.

An external pressure regulator (147) inlet (149) is shown positioned for insertion and connection to the length of flexible liquid conduit (150) that carries liquid to the body portion from an external source.

The one end (153), hereinafter the supply end, connects to an external liquid source. A receptacle fitting (197) configured to attach and connect to a hose or pipe inserts into the supply end of the flexible liquid conduit.

In one embodiment, a plug inserts into the other end (154), hereinafter the stop end, to prevent the liquid flowing out from the stop end of the flexible liquid conduit.

In yet another embodiment, a receptacle plug (155) inserts into the stop end of the flexible liquid conduit. The receptacle plug is configured for attachment of a conduit tubing connector (156) for attachment of a long length of conduit tubing (141) so a body portion may be placed a significant distance from the stop end of the flexible liquid conduit. This creates an expanded growing area for a spreading plant such as a tomato or cucumber plant for example, far from other plant growing body portion spaced along the conduit.

Figure 1M:
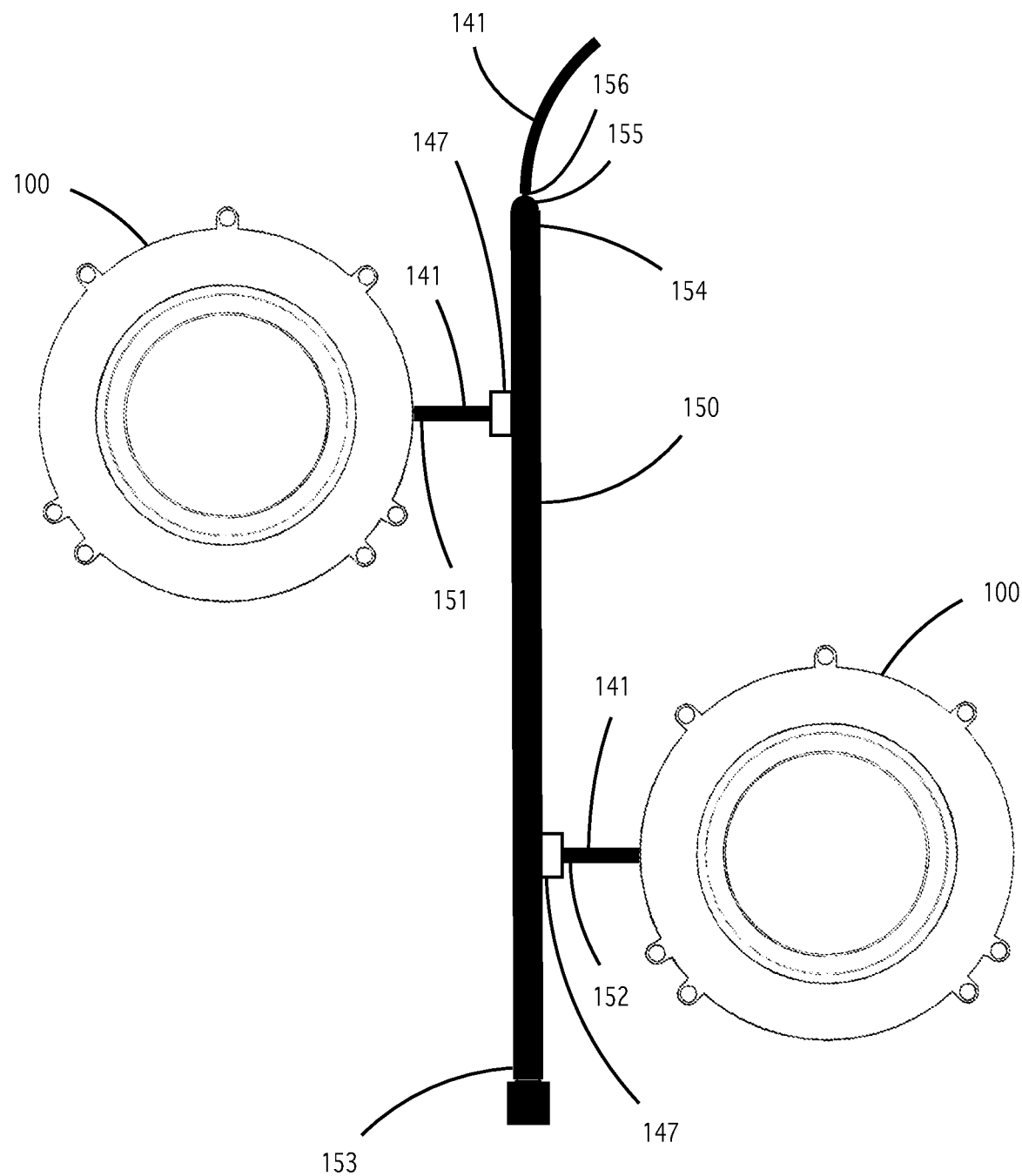

FIG. 1M shows an assembled top view of two exemplary body portions (100). Each body portion is connected to the flexible liquid conduit (150) by a length of conduit tubing (141). One end (151) connects and attaches to the body portion vessel inlet. The other end (152) attaches and connects to the external pressure regulator (147).

The external pressure regulator shown reduces the rate of liquid flow from the flexible liquid conduit tubing to each body portion.

The flexible liquid conduit shown has two ends. One end (153) hereinafter the supply end, connects to an external liquid source. A plug inserts into the other end (154) hereinafter the stop end, to prevent the liquid flowing out from the flexible liquid conduit stop end.

In one embodiment, a receptacle plug (155) inserts into the stop end of the flexible liquid conduit. The receptacle plug is configured for attachment of a conduit tubing connector (156) for attachment of a long length of conduit tubing (141) so a body portion may be placed a significant distance from the stop end of the flexible liquid conduit.

Alternating body portions along both sides of the flexible liquid conduit maximizes plant growth and increases production.

A linear liquid conduit enables an array of body portions to grow plants along a more or less a straight line: along a fence, the outline of a letter of an alphabet, a number or a symbol, for example.

Figure 1N:
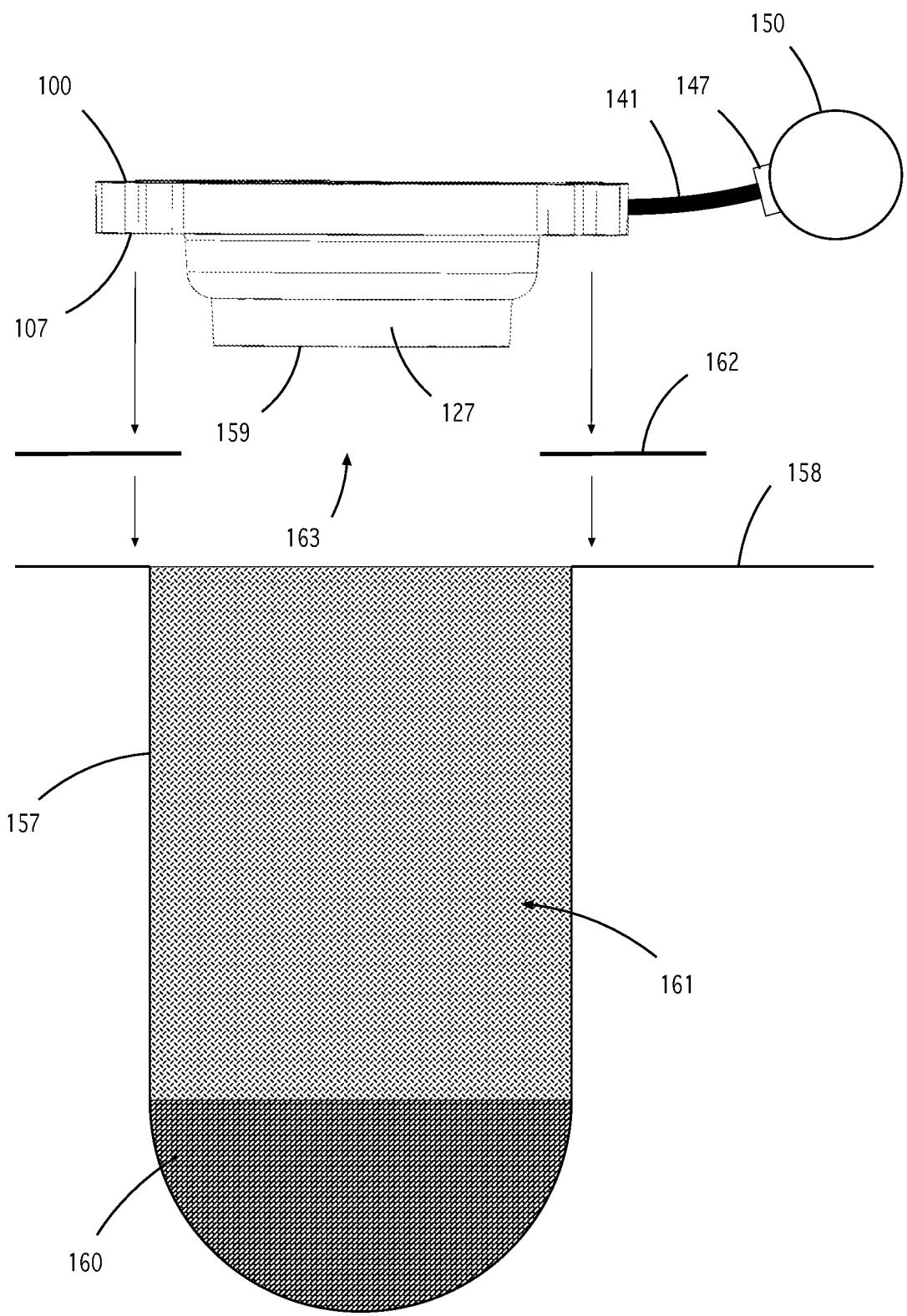
Figure 1O:
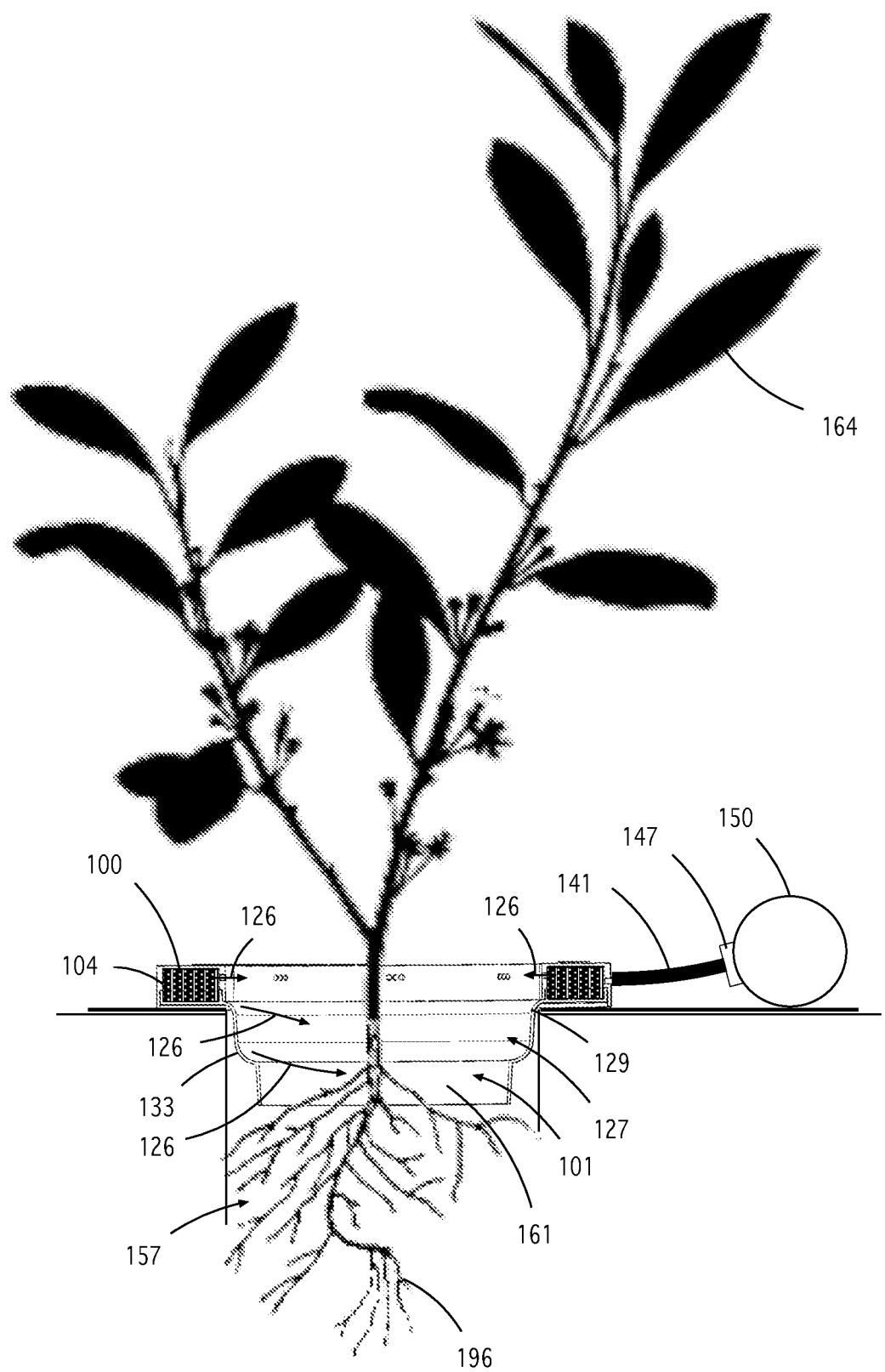

FIG. 1N shows an exploded sectioned view of an exemplary below grade cavity portion (157) tubular in shape and excavated by hand or by mechanical means in earth and/or soil (158).

The circumference of the bottom end (159) of the funnel shaped cavity aperture (127) is used to trace out the approximate diameter of the below grade cavity portion. Excavation varies in depth according to plant type, projected plant root development and fertilizer requirements.

After excavation, a nutrient (160) is placed at the bottom of the cavity portion where it is covered with a growth medium (161) approximately half way up the cavity. The nutrient at the bottom of the cavity may be a man made fertilizer or a natural source animal manure, for example. An example of growth medium could be a plant propagation potting mix comprising aged plant compost. A second layer of nutrient may be optionally placed over the growth medium to aid in plant growth, flowering and fruit set. Common second layer nutrients could include Epson salts and/or volcanic ash to name a few.

Alternatively shaping the cavity into the shape of a cone mimics the natural shape of the roots of a plant A cone shape having a wider bottom than the top will provide additional space for nutrient and room for the conical growth pattern of plant roots.

A ground cover (162) is laid out over the soil to inhibit weed growth. Again, the circumference of the bottom end of the funnel shaped cavity aperture is used to line trace and cut an opening (163) in the ground cover.

The body portion (100) funnel shaped cavity aperture (127) inserts through the opening fashioned in the ground cover and into the earth and/or soil cavity portion so the bottom of the funnel shaped cavity aperture rests upon the growth medium that fills the cavity portion and the flange (107) shown configured about the body portion rests upon the ground cover. The flange holds the ground cover in place about the body portion.

The liquid containment vessel configured above the flange filled with liquid prevents removal of the body portion from excessive windblow at least partially.

Filling the inserted funnel shaped cavity aperture with growth medium fills the remainder of the cavity portion in ready for the planting of plant(s) or sowing of seed(s).

A length of conduit tubing (141) connects the body portion (100) to the external pressure regulator (147) that is connected to the flexible liquid conduit (150).

Figure 1P:
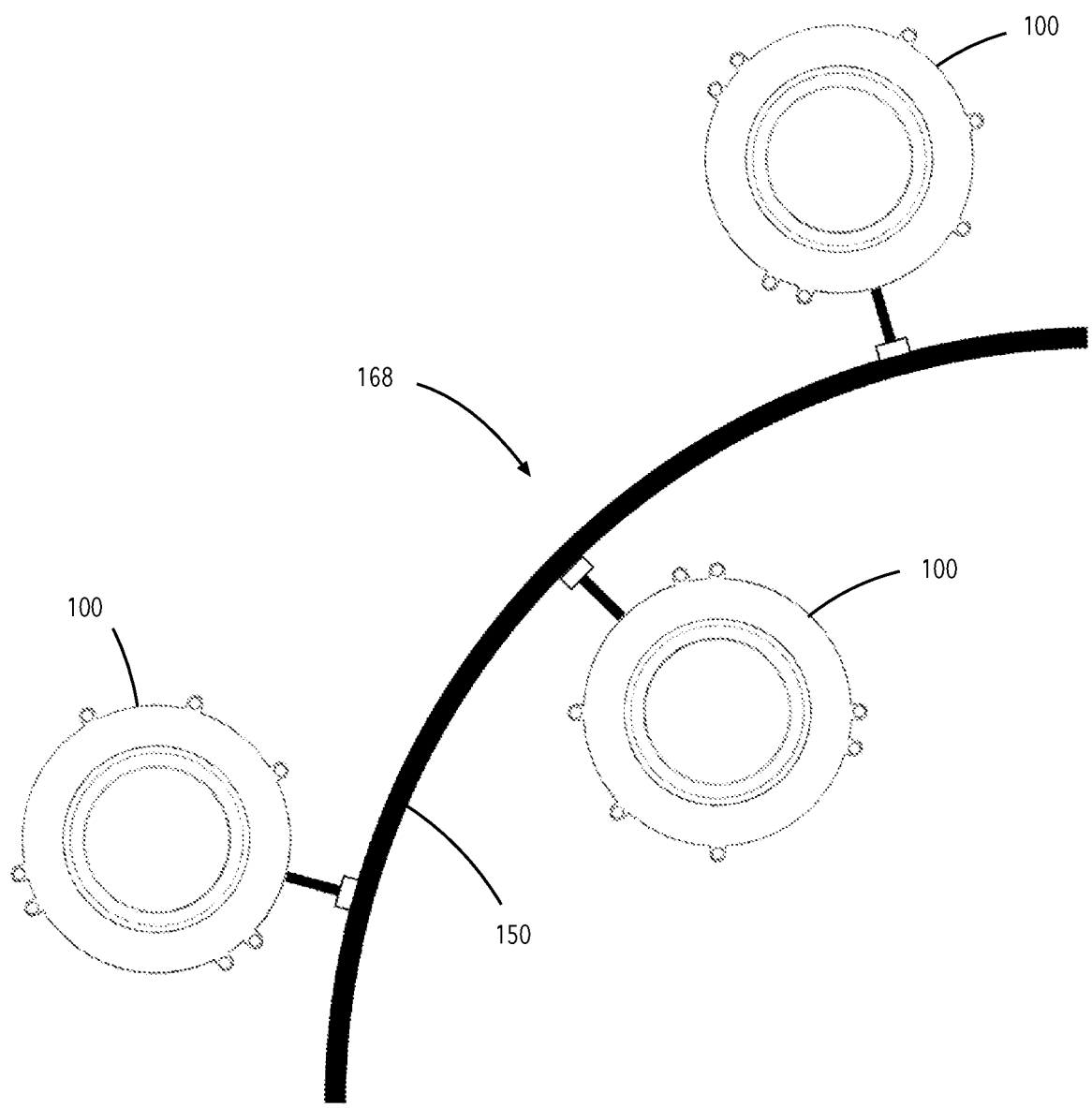
Figure 1Q:
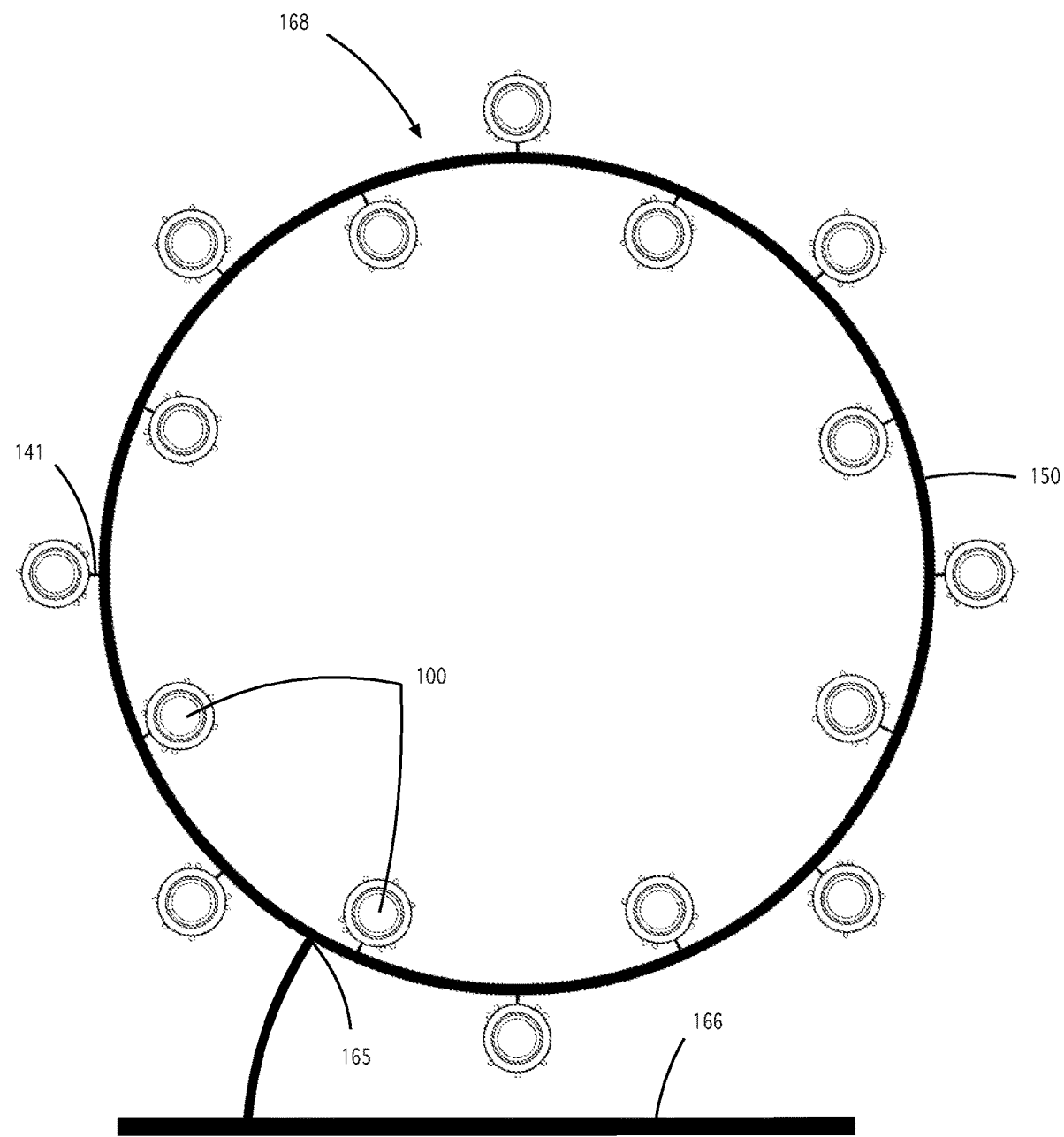

FIG. 1Q shows an assembled sectioned view of an exemplary body portion (100) inserted into a below grade cavity portion (157) fashioned in earth and/or soil.

A length of conduit tubing (141) connected to an external pressure regulator (147) inserted into a flexible liquid conduit (150) provides liquid to the body portion (100) liquid containment vessel (104).

At least one plant (164) is shown imbedded in growth medium (161) within the aperture (101) at the center of the body portion.

The first slope (129) of the funnel shaped cavity aperture (127) directs a flow of liquid (126) to the at least one plant when the liquid is dispersed by a partially sealed inner cavity wall of the liquid containment vessel.

The second slope (133) directs a flow of liquid (126) from the first slope to the root (196) of the at least one plant.

FIG. 1P shows a detailed top view of an array of exemplary body portions (168) connected to a curved length of liquid conduit (150) having two ends.

One end of the flexible liquid conduit tubing connects to an external liquid source. A plug inserts into one end to prevent the flow of the liquid out the other end.

A curved liquid conduit enables an array of body portions (100) to bend around obstacles to grow plants or grow plants of particular design or pattern that features curves.

FIG. 1Q shows a detailed top view of an array of exemplary body portions (168) connected to a closed circle length of flexible liquid conduit (150) having two ends where one end is connected to the other.

A circle shaped liquid conduit enables an array of body portions to grow plants around an object: around a bolder, for example. Arranging an array of body portions in a circle also form a letter of an alphabet forms a number or forms a symbol.

A conduit connector inserted where the two ends of the liquid conduit join provides for connection of a 3-way t-shaped conduit connector (165) that attaches to a main feed line (166) outside the circle. The main feed line conveys liquid through the conduit connector to the array of body portions (100) connected to the flexible liquid conduit (150).

A length of conduit tubing (141) connects each of the body portions (100) to the length of flexible conduit.

Figure 1R:
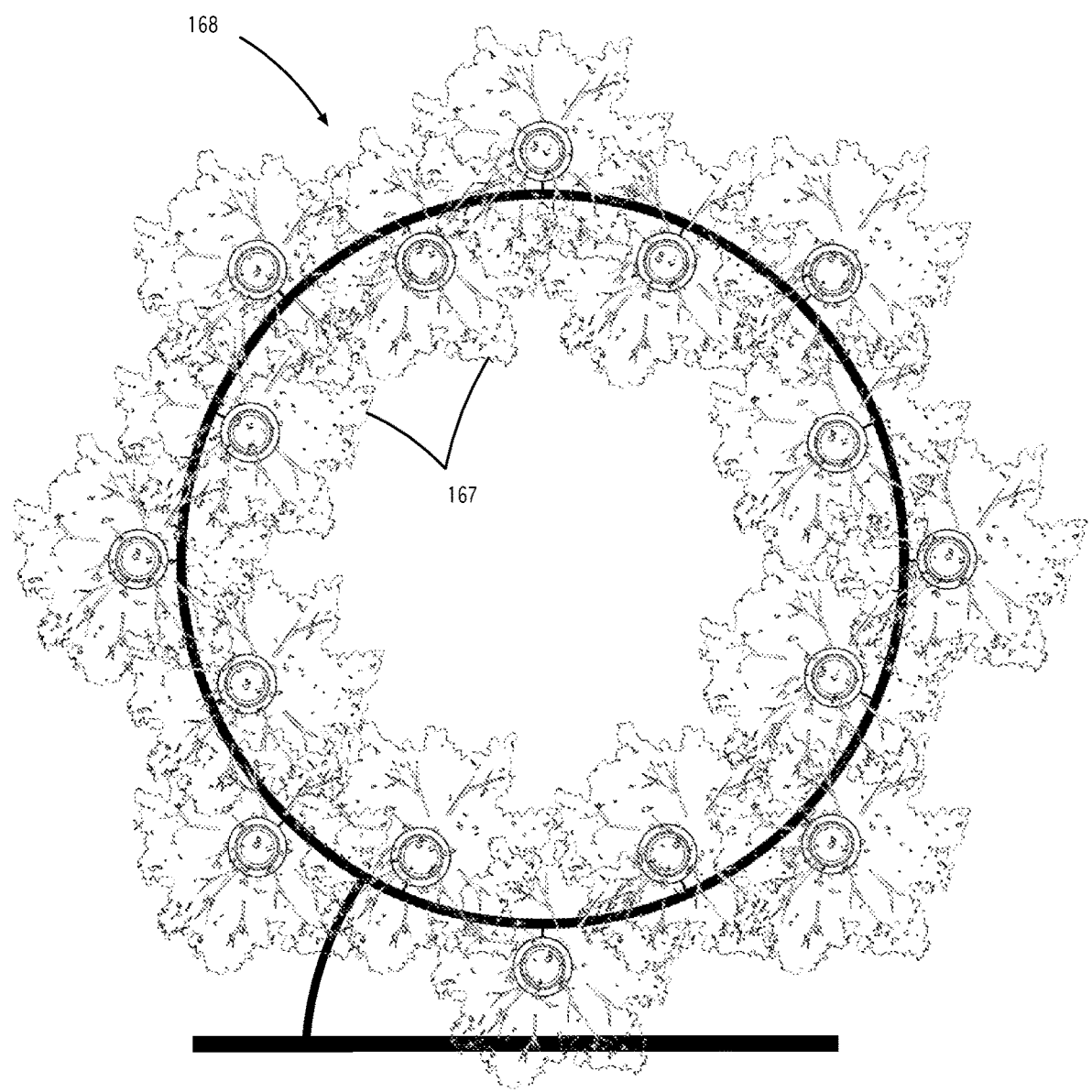

FIG. 1R shows a detailed top view of pluralities of plants (167) growing about a circle shaped array of body portions (168).

An array of body portions alternately spaced about the liquid conduit shows plants growing in the shape of a circle.

In the embodiment shown, the array spells out the letter "O" of the English alphabet or the number "0" with the use of plants.

Figure 1S:
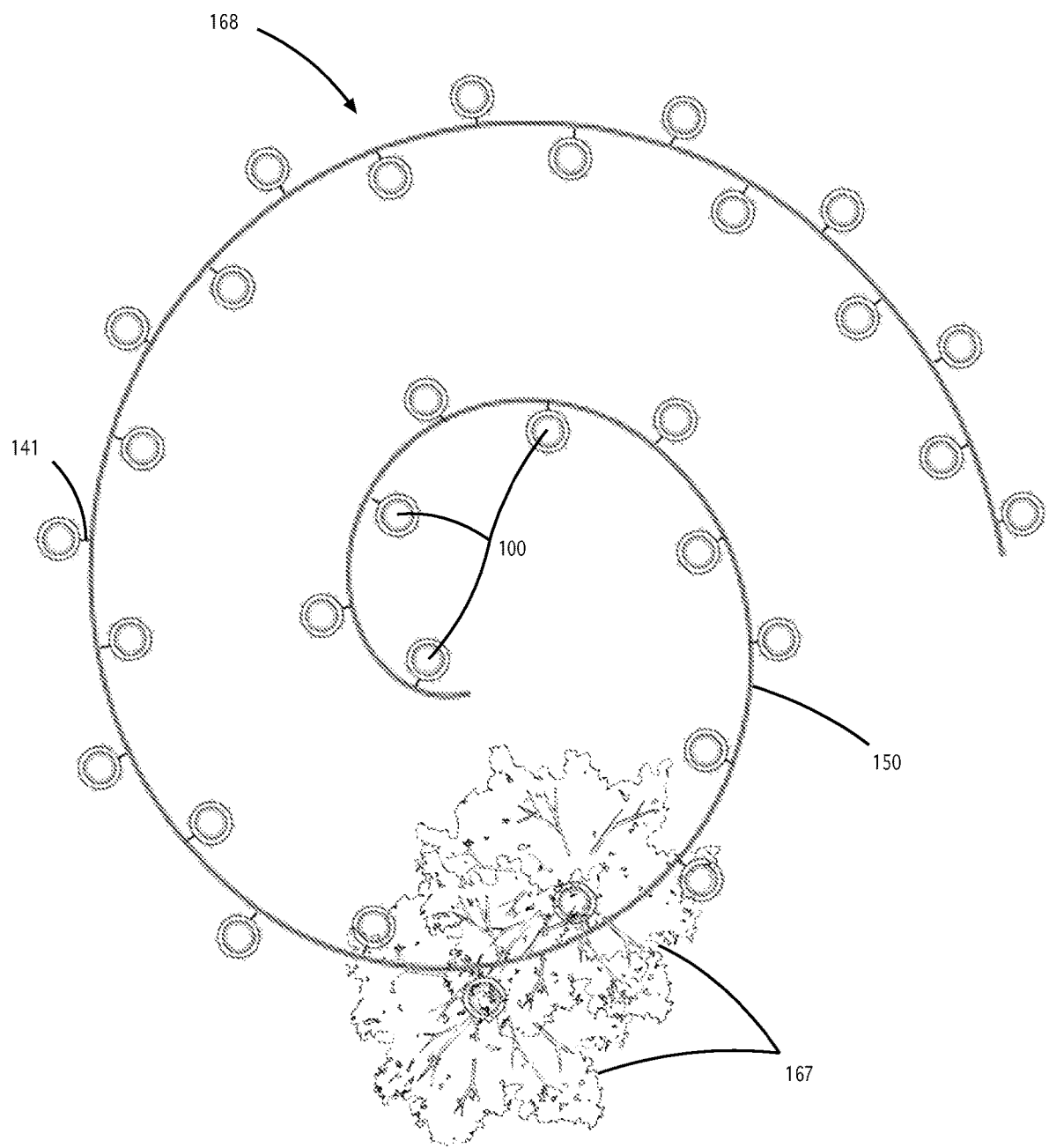

FIG. 1S shows a detailed top view of an array of exemplary body portions (168) connected to a length of liquid conduit (150) having two ends configured into the shape of a spiral.

A length of conduit tubing (141) connects each of the body portions (100) to the length of flexible conduit.

An array growing plants (167) in a spiral maximizes light penetration thereby increasing potential for plant growth, flower and fruit set.

The spiral array provides easy and convenient access via pathways configured between spiral loops for planting, tending and harvesting.

A spiral array utilizing a minimized number of body portions uses just one connection at one end of the liquid conduit to convey liquid from an external source to plants growing along the liquid conduit. However, a spiral array utilizing a maximized number of body portions requires a liquid conveyance connection at both ends of the flexible liquid conduit to ensure an adequate supply of liquid to plants growing about the spiral array.

Figure 1T:
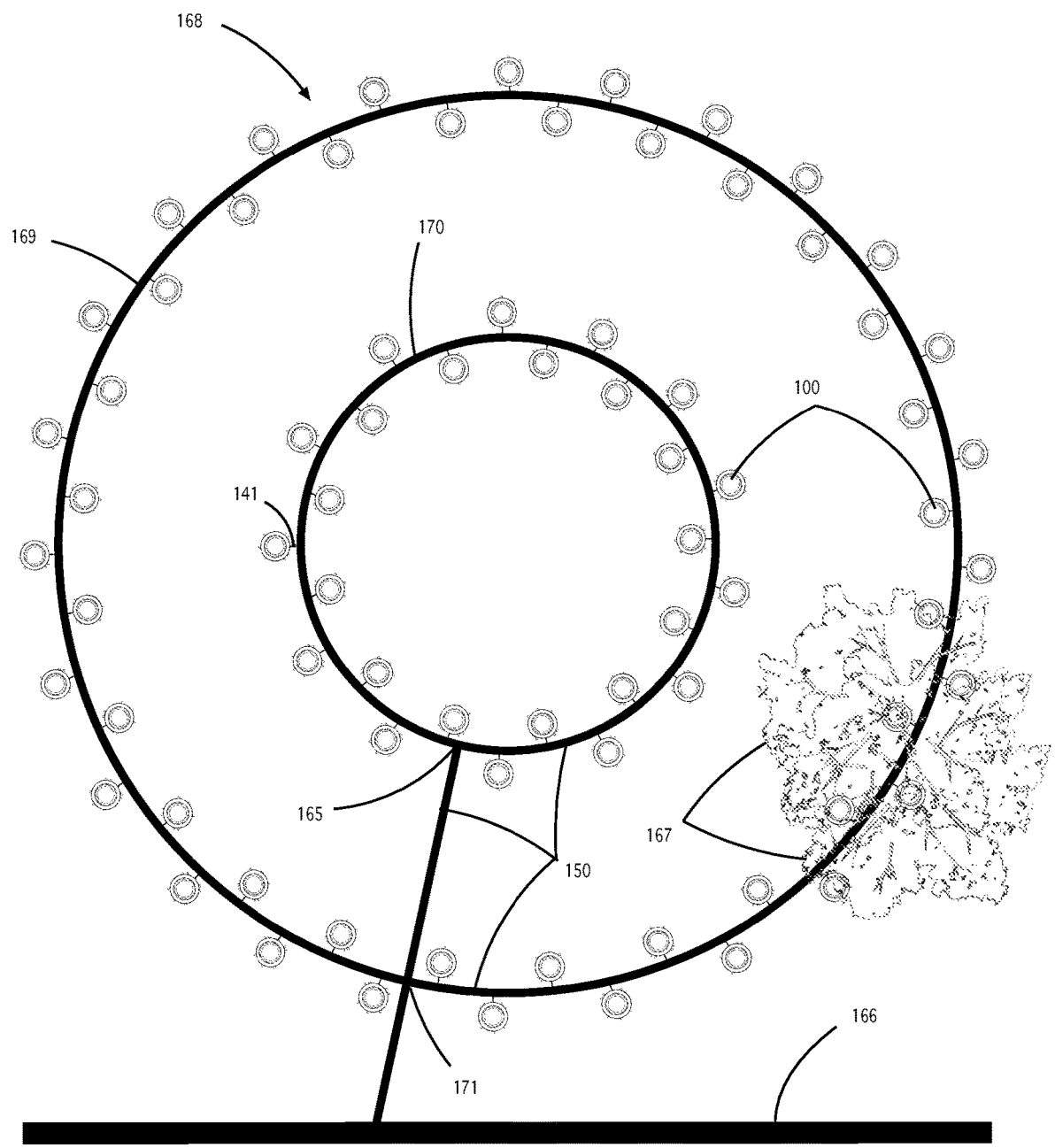

FIG. 1T shows a detailed top view of an array of exemplary body portions (168) connected to two lengths of liquid conduit that form two concentric circles; an outer circle (169) and an inner circle (170).

A conduit connection where the two ends of each the liquid conduit inner circle join provides for insertion of a 3-way conduit connector (165) that connects the inner circle to a flexible conduit liquid supply line (150).

A conduit connection where the two ends of each the liquid conduit outer circle join provides for insertion and insertion of a 4-way liquid connector (171) that connects the outer circle a flexible conduit liquid supply line (150) that connects to a main feed line (166) that conveys liquid from an external source.

The main feed line conveys liquid through the two conduit connectors to the array of body portions structured and arranged about each of the two concentric circles.

A length of conduit tubing (141) connects each of the body portions (100) to both lengths of flexible conduit used to form each circle.

Concentric circles are advantageous for growing different plant types. Lettuce may be grown in one circle and spinach in the other, for example.

Figure 1U:
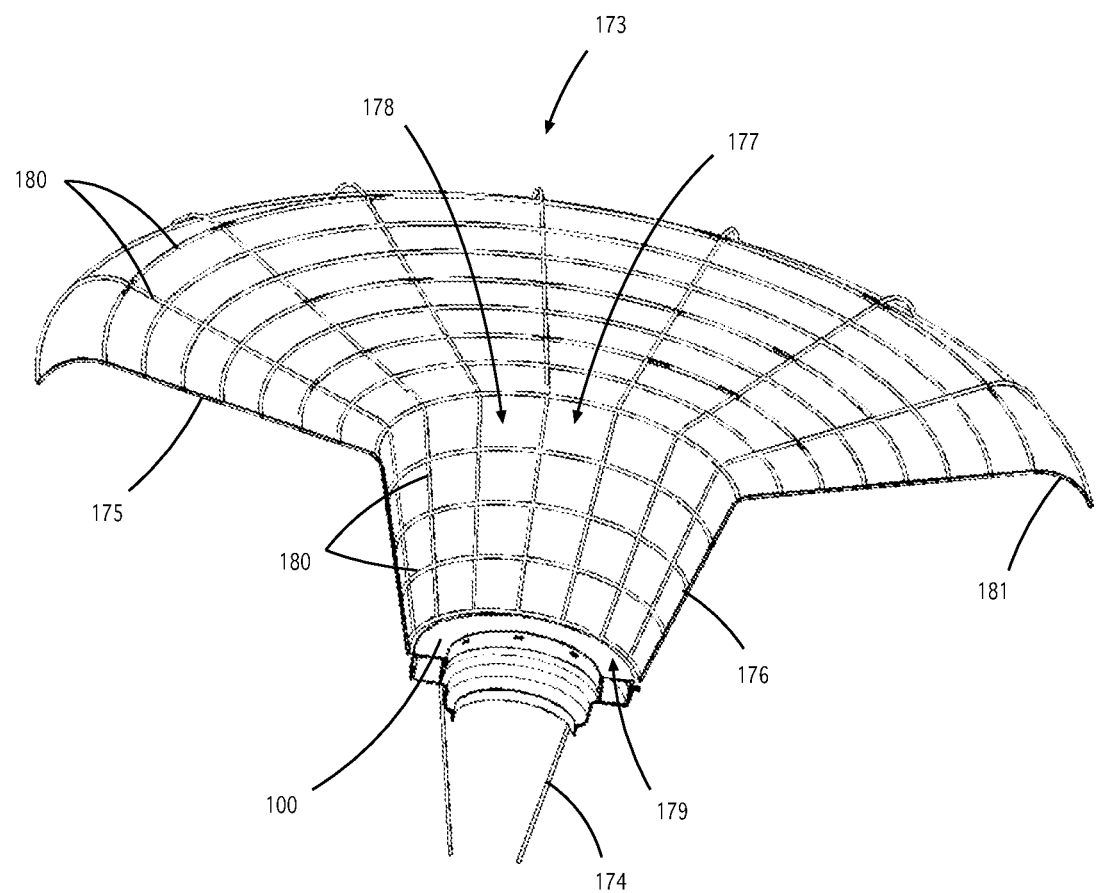

FIG. 1U shows a detailed sectioned view of an exemplary body portion joined with an exemplary plant support portion (173).

Pluralities of tabs configured with openings extend out from the body portion (100) for insertion of at least three legs (174) of the plant support. The tabs are also structured and arranged for insertion of a plant support with four legs.

The plant support portion shown comprises a horizontal support portion (175) joined with a vertical tunnel portion (176) and leg portion (174).

The horizontal support portion is shown configured above the vertical tunnel portion to support the flowering and fruiting portions of plants above grade. Supporting flowering and fruiting portions of plants above grade keeps fruit dry and less susceptible to a variety of water borne diseases that generally spawn at ground level.

The surface of the circle shaped horizontal support portion slopes down to an aperture (177) configured at the center.

The vertical tunnel portion is tubular with an open top end (178) and an open bottom end (179). The open top end joins with the horizontal support portion aperture.

At least one plant is disposed to grow within the hollowed interior of the tubular tunnel portion. The horizontal support portion and the vertical tunnel portion are comprised of structural members (180) shown spaced a distance apart providing strength and structural integrity.

Minimized spacing between the structural members of the vertical tunnel portion encourages at least one plant to grow up and through the open top end of the vertical tunnel portion.

Spacing between said structural members of the horizontal support portion permit ambient air flow throughout said plant portions, which enables a drying effect to benefit of the fruit and flower of the at least one plant. The drying effect provided by ambient air circulation prevents the onset of "blossom end rot"—a fruit damaging affliction caused by water droplets that collect and remain at the bottom end of a fruit for several hours or even days before drying.

A curved surface edge (181) is shown configured about the circumference of horizontal support portion prevents damage to portions of the plant that hang down from the support portion perimeter edge.

Two of three legs are shown configured about the circumference of the open bottom end of the vertical tunnel portion for insertion into corresponding openings configured within the tabs that extend out from the top portion outer sidewall. Each plant support leg imbeds into the growth medium that encompasses the device securing both the plant support and the body portion in place preventing removal from windblow.

Alternatively, at least one fastener such as a nail or spike may be inserted into the openings to prevent dislodgement or removal of the body portion from windblow.

Creating an elevated platform above grade with an expanded surface area is advantageous for plant portions to spread, flower and be fruitful. Tomato, melon and cucumber plants elevated in full sun grow and produce to their full potential from growing over the expanded surface area provided by the horizontal support portion, for example.

Plants are encouraged to branch and vine, as they would grow in a natural environment along the ground without vertical support. Forcing plants to grow vertically significantly reduces leaf cover, which has a tendency to scald fruit from exposure to the sun.

The exemplary configuration and robust fabrication supports the at least one plant weighted with an extraordinary amount of vegetation and fruit produced by the enhanced growing environment by the exemplary plant support portion.

Figure 1V:
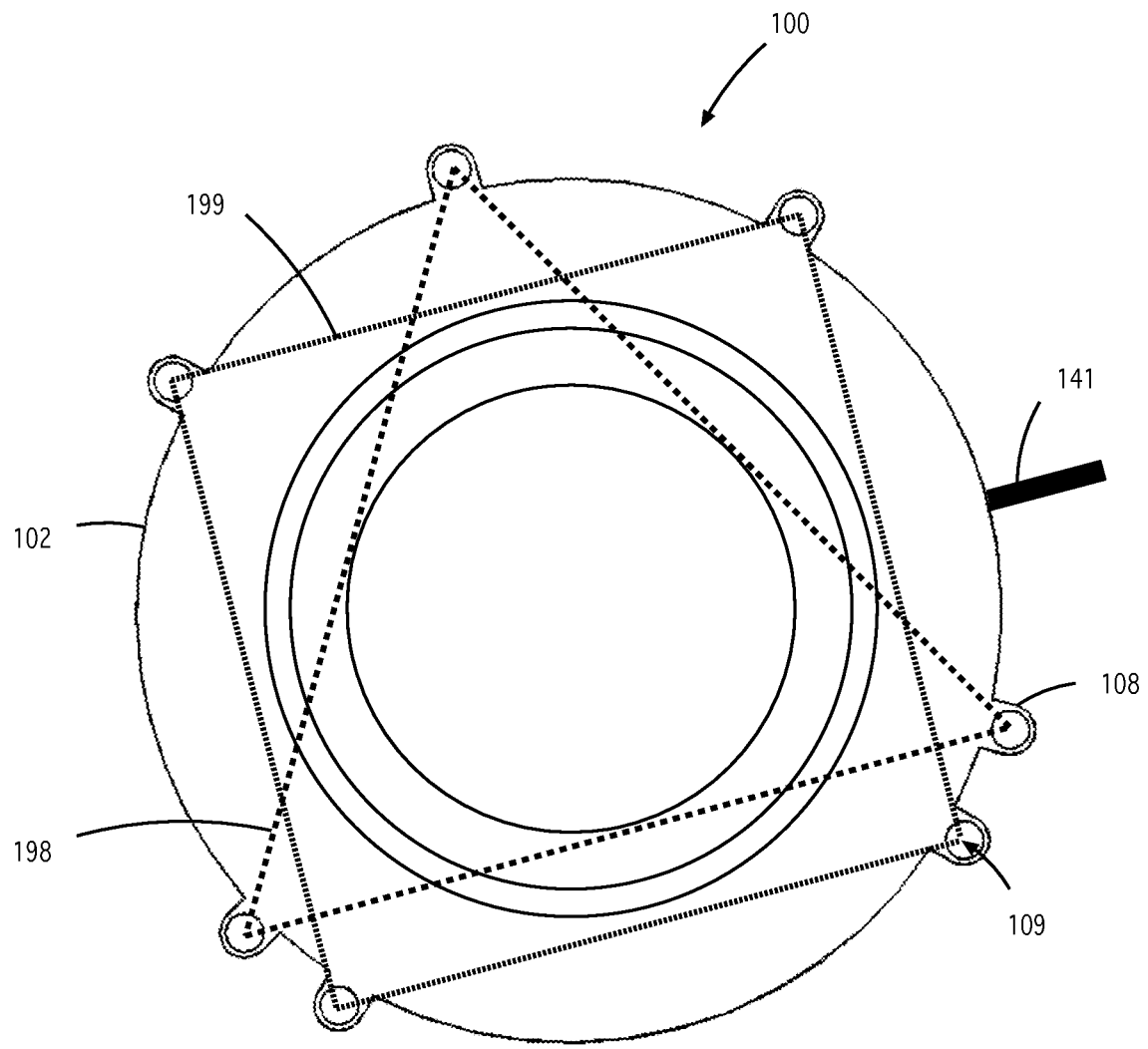

FIG. 1V illustrates a detailed top view of an exemplary body portion (100) showing an outline of a three leg plant support (198) and an outline of a four leg plant support (199) disposed for insertion into pluralities of corresponding tabs (108) with openings (109) spaced about the top portion (102).

Figure 1W:
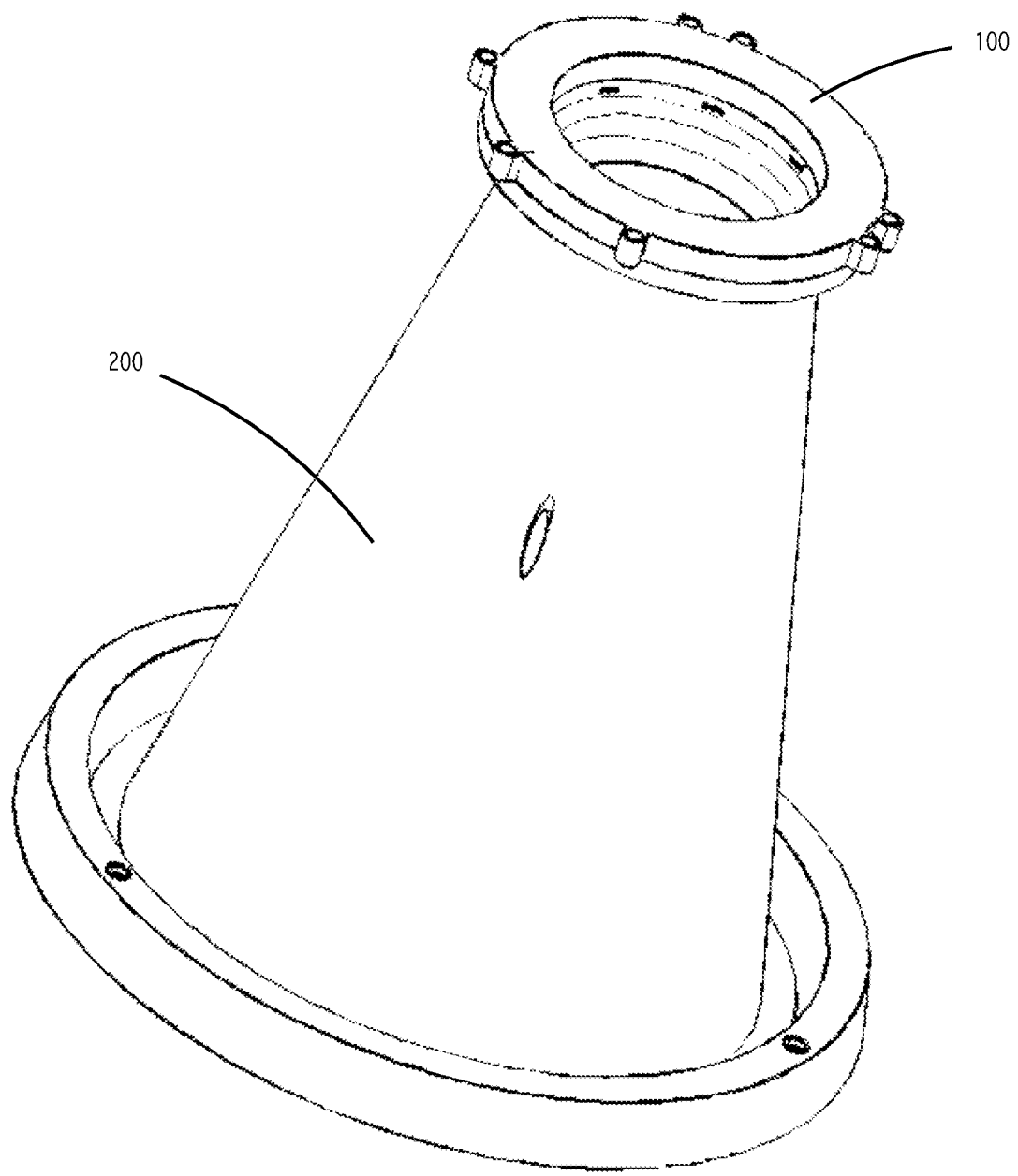

FIG. 1W shows a perspective view of an exemplary body portion (100) joined with an exemplary container portion (200), in accordance with an embodiment of the present invention.

The open bottom (201) of the container portion is disposed to rest upon earth and/or soil at grade or within a liquid catchment device such as a plant pot saucer. The earth and/or soil at grade may be covered with a ground cover to inhibit undesirable weed growth. An opening fashioned in the ground cover below the container portion open bottom permits the pass through of plant roots from the container portion into the earth and/or soil.

A growth medium fills the container portion through the open top (202). The body portion is inserted through the open top imbedding the body portion into the growth medium at least partially so the body portion flange (107) rests upon the container portion planar flange (203). A length of conduit tubing (141) used to convey liquid to the one or more plants connects to the body portion.

At least one fastener is inserted through the opening provided in the body portion tab. The faster shown is a common nail or spike. The fastener is further inserted into a corresponding opening (215) provided in the sidewall (213) of the container portion and into a growth medium contained within. The insertion the at least one fastener prevents removal of a body portion joined with the container portion from windblow. The insertion of pluralities of fasteners prevents removal of a body portion joined with the container portion from excessive windblow.

Alternatively, at least one support portion leg (174) may be inserted through the opening provided in the body portion tab. The support portion leg inserts further into a corresponding opening provided in the container portion sidewall through into a growth medium contained within. Insertion of a plurality of support portion legs prevents removal of a support portion joined with a body portion that is joined with a container portion from excessive windblow.

Figure 1X:
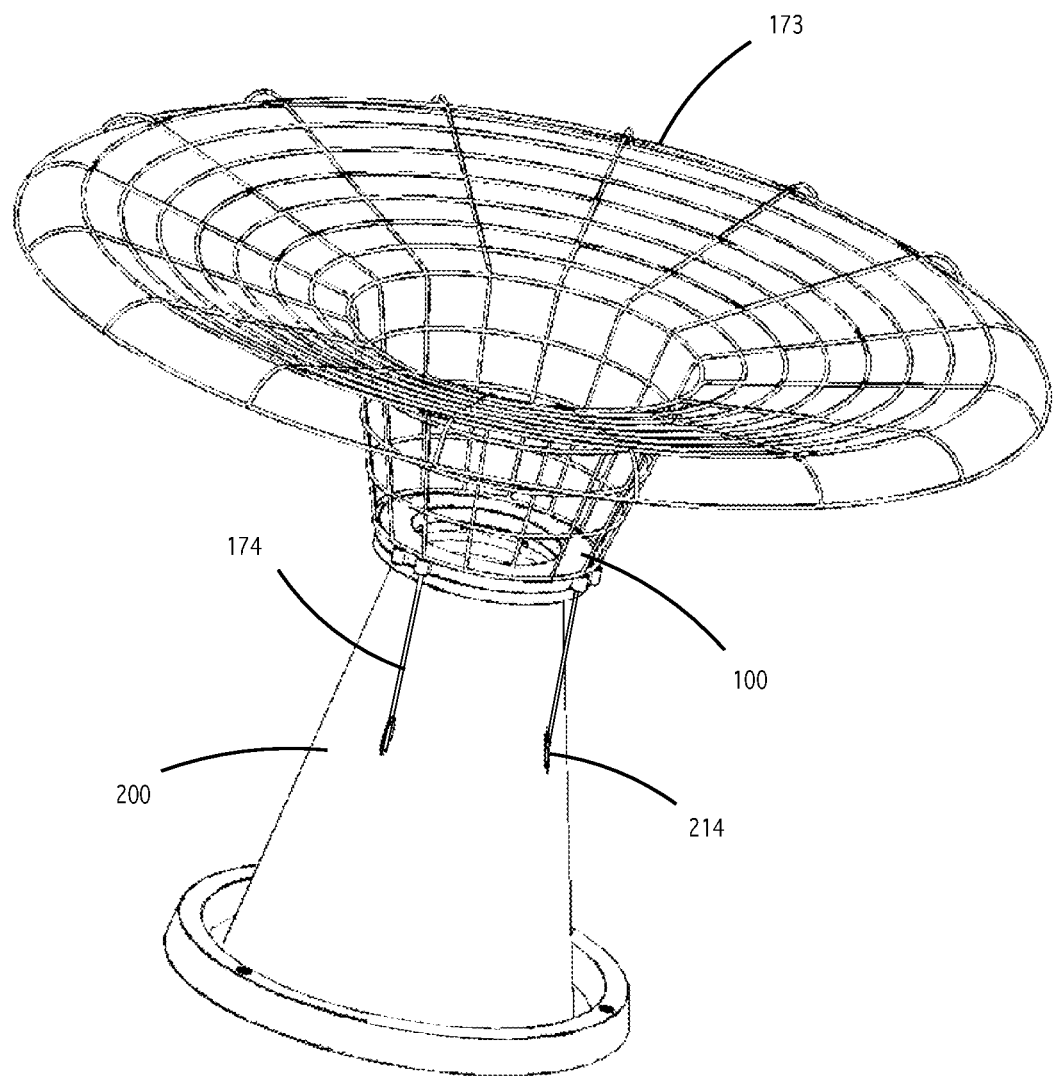

FIG. 1X illustrates a detailed perspective view of a plant support portion (173) joined with a body portion (100) joined with a container portion (200) showing the legs (174) of the support portion inserted through openings (214) configured in the container portion sidewall, in accordance with an embodiment of the present invention.

Inserting the legs of the plant support portion into the openings provided in the container sidewall prevents removal of the plant support portion from windblow.

Figure 2A:
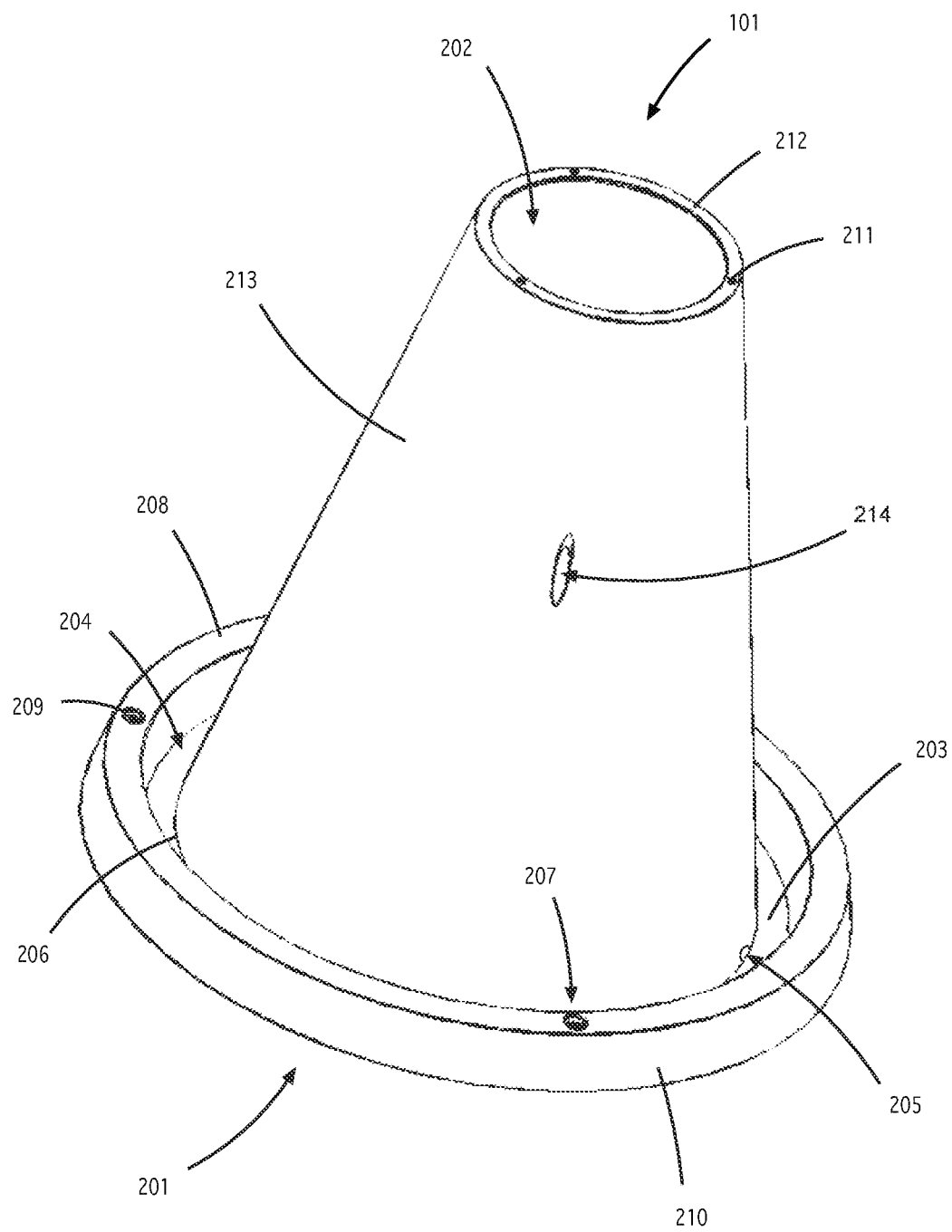
FIG. 2A illustrates a detailed perspective view of a container portion showing a cavity encompassing the open bottom of the container portion, in accordance with an embodiment of the present invention.

FIG. 2A illustrates a detailed perspective view of an exemplary container portion (200), in accordance with an embodiment of the present invention.

The container portion mimics the conical shape of the of roots of a plant and has an open bottom (201) and an open top (202).

The open bottom permits root penetration from at least one plant into earth and/or soil below grade.

The open top permits insertion of a body portion after the container portion is filled with growth medium.

A cavity (204) is shown configured about the open bottom. The cavity collects excess liquid drained from at least one opening (205) configured at the lower edge (206) of the container portion.

Pluralities of openings (207) are spaced about a planar surface (208) configured about the cavity for insertion of at least one fastener used to secure the container portion in place at grade.

The vertical wall (209) shown encompassing each planar surface opening elevates the head of a faster such as a nail or spike above the planar surface to permit insertion of a fastener removal tool.

The sloped wall (210) shown configured about said planar surface perimeter adds structural integrity to the cavity.

Pluralities of protrusions (211) are spaced about a planar flange (212) that extends into the interior of the open top at least partially. The protrusions provide separation of one container portion inserted into another for ease of removal after a nested shipment.

At least one opening is configured in the container portion sidewall for insertion of a fastener or the leg of an exemplary plant support.

Figure 3A:
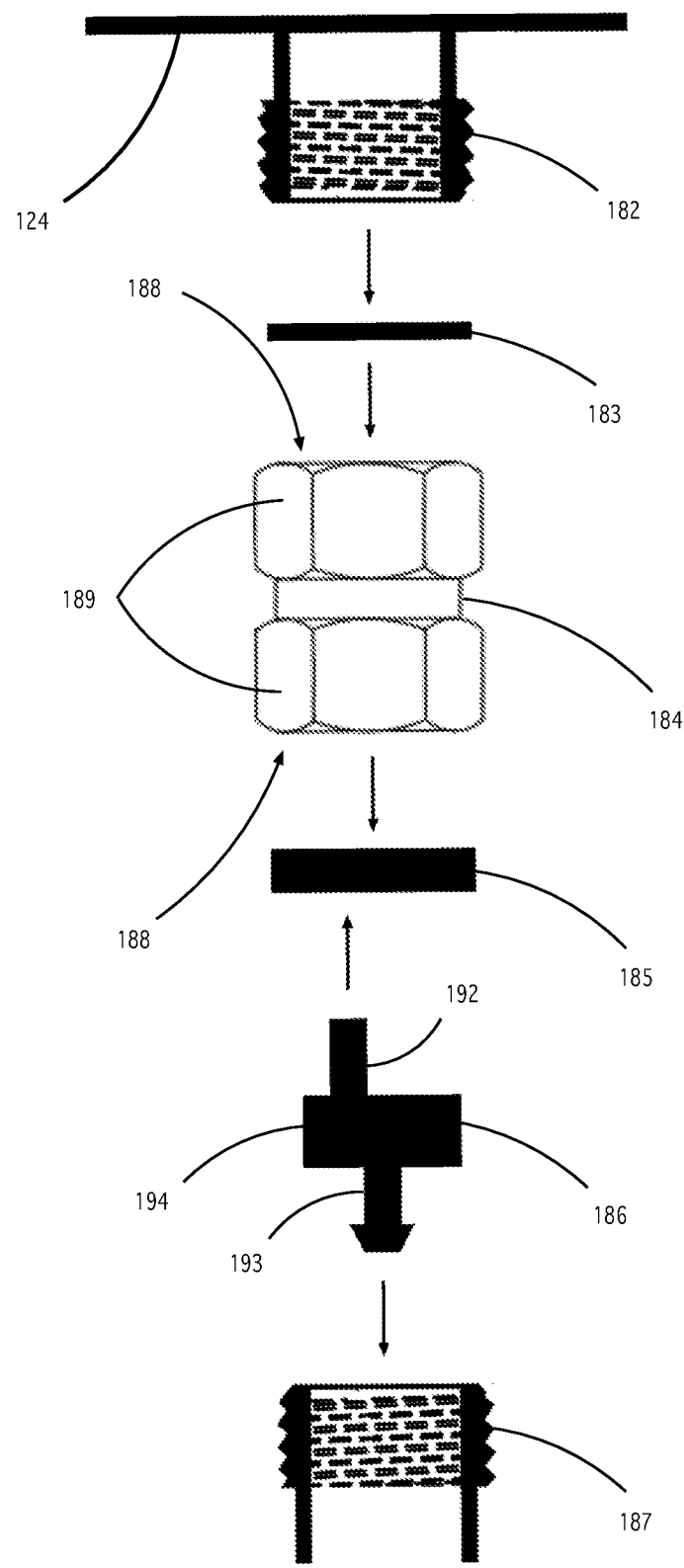
FIGS. 3A, 3B and 3C illustrate various views of an exemplary washer portion where.
Figure 3B:
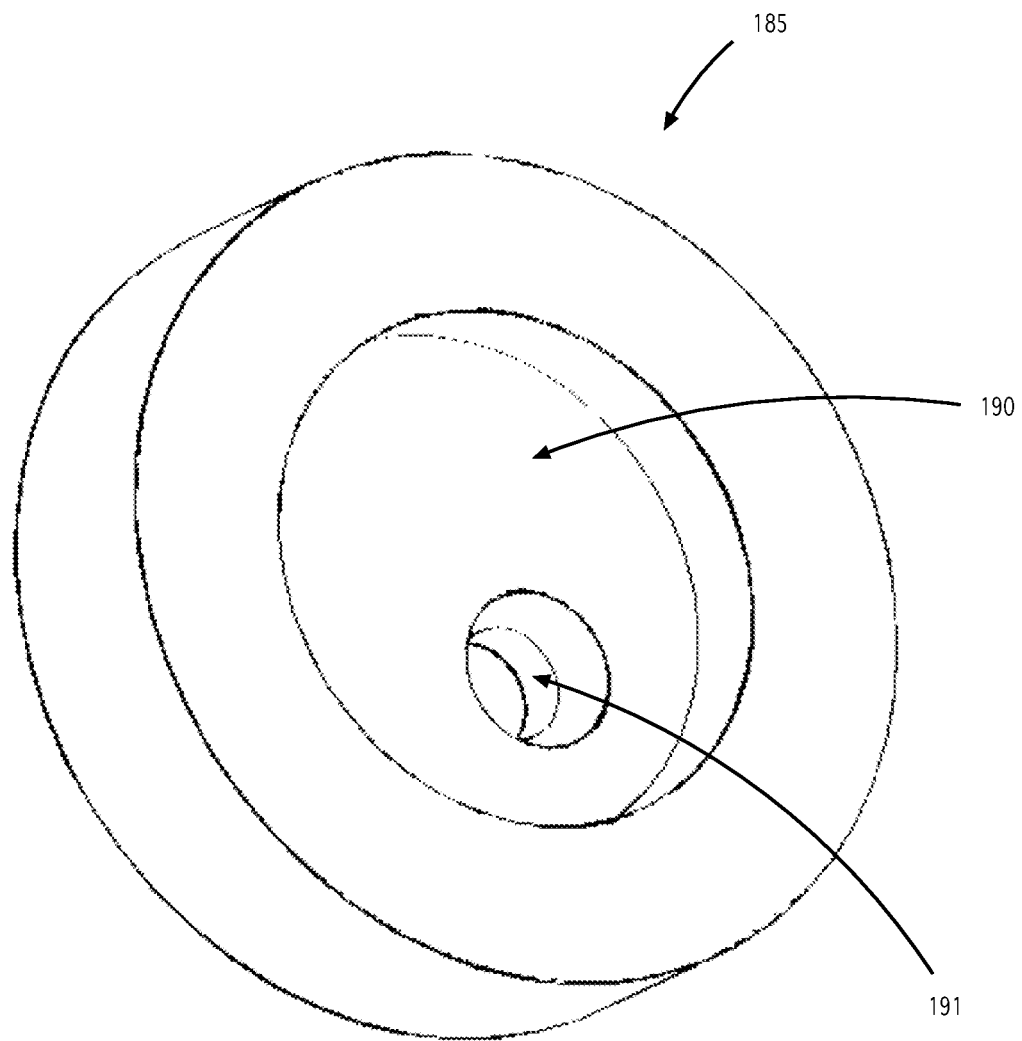
Figure 3C:
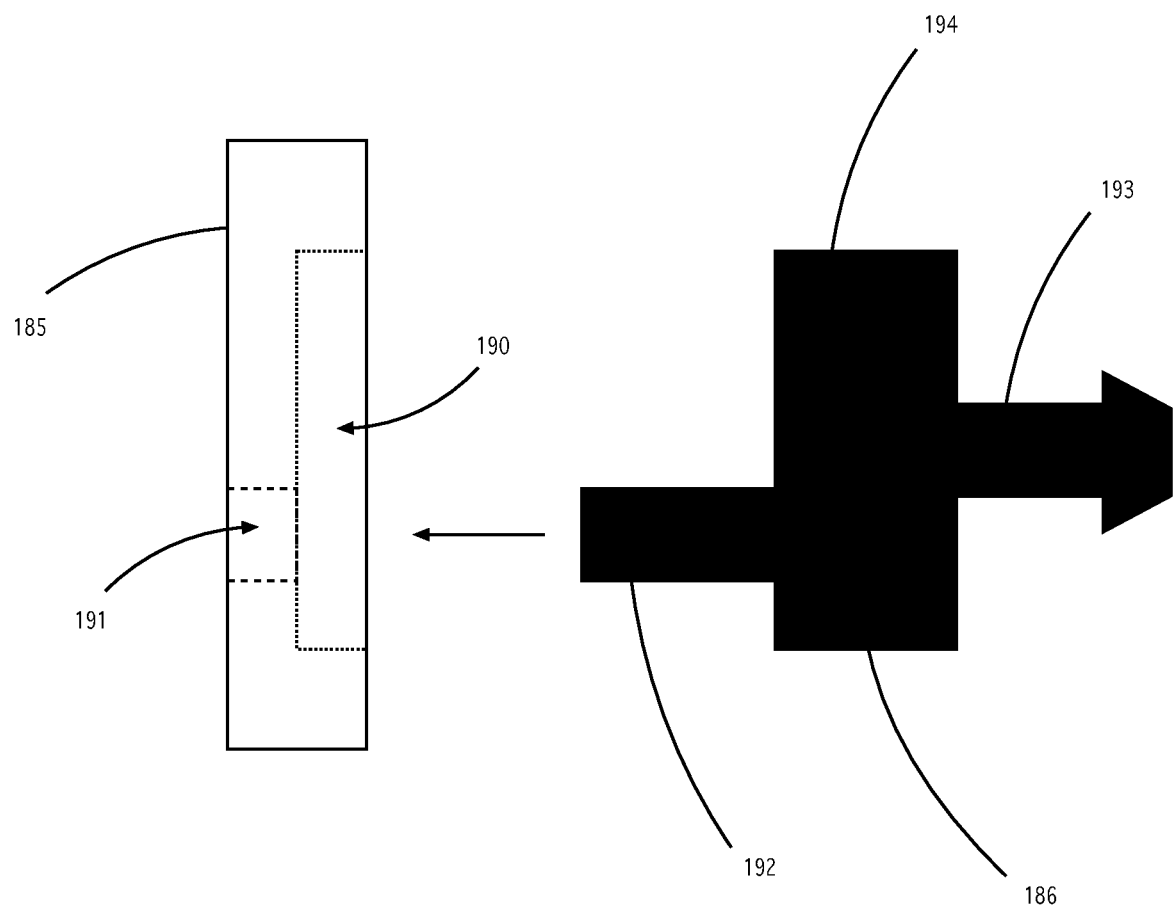

FIGS. 3A, 3B and 3C illustrate various views of an exemplary washer portion (185), in accordance with an embodiment of the present invention.

FIG. 3A illustrates a detailed exploded side view of an exemplary liquid containment vessel outer wall (124), a liquid containment vessel receptacle (182), a washer (183), an attachment fitting (184), a washer portion (185), an internal pressure regulator (186) and the receptacle (187) end of a hose or pipe.

In the embodiment shown, the receptacle (182) for the attachment of a hose or pipe attachment fitting is configured in the outer wall (124) of the liquid containment vessel.

The attachment fitting (184) is configured having a swivel adjustment female receptacle (188) at each end. One female receptacle is configured for insertion and the rotational attachment of a male receptacle (187) configured at the end of a hose or pipe. The other female receptacle (188) is configured for insertion and rotation attachment of the liquid containment vessel receptacle (182) configured as a male receptacle. The swivel adjusters (189) are used to tighten the male to female attachments after insertion.

The common washer (183) inserts into the liquid containment vessel receptacle end of the attachment fitting to prevent leakage of liquid conveyed to the liquid containment vessel.

Insertion of the liquid containment vessel receptacle holds the washer in place.

The washer portion (185) inserts into the hose or pipe receptacle end of the attachment fitting also prevents leakage of the liquid conveyed to the liquid containment vessel.

The washer portion is configured for insertion of the internal pressure regulator (186). The pressure regulator reduces the PSI of the liquid delivery conduit to manageable level to controls the amount of liquid dispersed to at least one plant embedded in growth medium that grows within the body portion aperture.

Insertion of the hose or pipe end receptacle holds the washer portion in place.

The internal pressure regulator also controls the duration of liquid dispersal to at least one plant embedded in growth medium within the body portion aperture.

A cavity is shown configured within the washer portion for partial insertion of the internal pressure regulator body.

An opening configured within the indentation permits pass through of an outlet (192) that extends out from the body (194) of the internal pressure regulator.

Insertion of the outlet through the opening and insertion of the body of the internal pressure regulator into the cavity at least partially holds the internal pressure regular in place within the attachment fitting while in use.

The orientation of the outlet passes liquid through to the liquid containment vessel.

An inlet (193) is shown extending out from the internal pressure regulator body (194).

The orientation of the inlet gathers the liquid conveyed by the hose or pipe from an external source into the internal pressure regulator.

FIG. 3B illustrates a detailed perspective view of an exemplary washer portion (185) showing the cavity (190) and the opening (191) configured within the cavity for partial insertion of the body of the internal pressure regulator.

A washer portion fabricated from a flexible material will be pliable and easy to insert into the hose or pipe end of the attachment fitting. The flexible material is disposed to compress and expand tight against the interior wall of the fitting after insertion of the receptacle end of the hose or pipe thereby creating a seal to prevent leakage of the liquid.

FIG. 3C illustrates a detailed view of the internal pressure regulator (186) positioned for insertion into a sectioned view of the exemplary washer portion (185).

The body (194) of the internal pressure regulator (186) inserts into the washer portion (185) cavity (190), which inserts the outlet (192) through the cavity opening (191). The internal pressure regulator inlet (193) extends from the internal pressure regulator body for insertion into the male receptacle end of a hose or pipe.

Figure 4A:
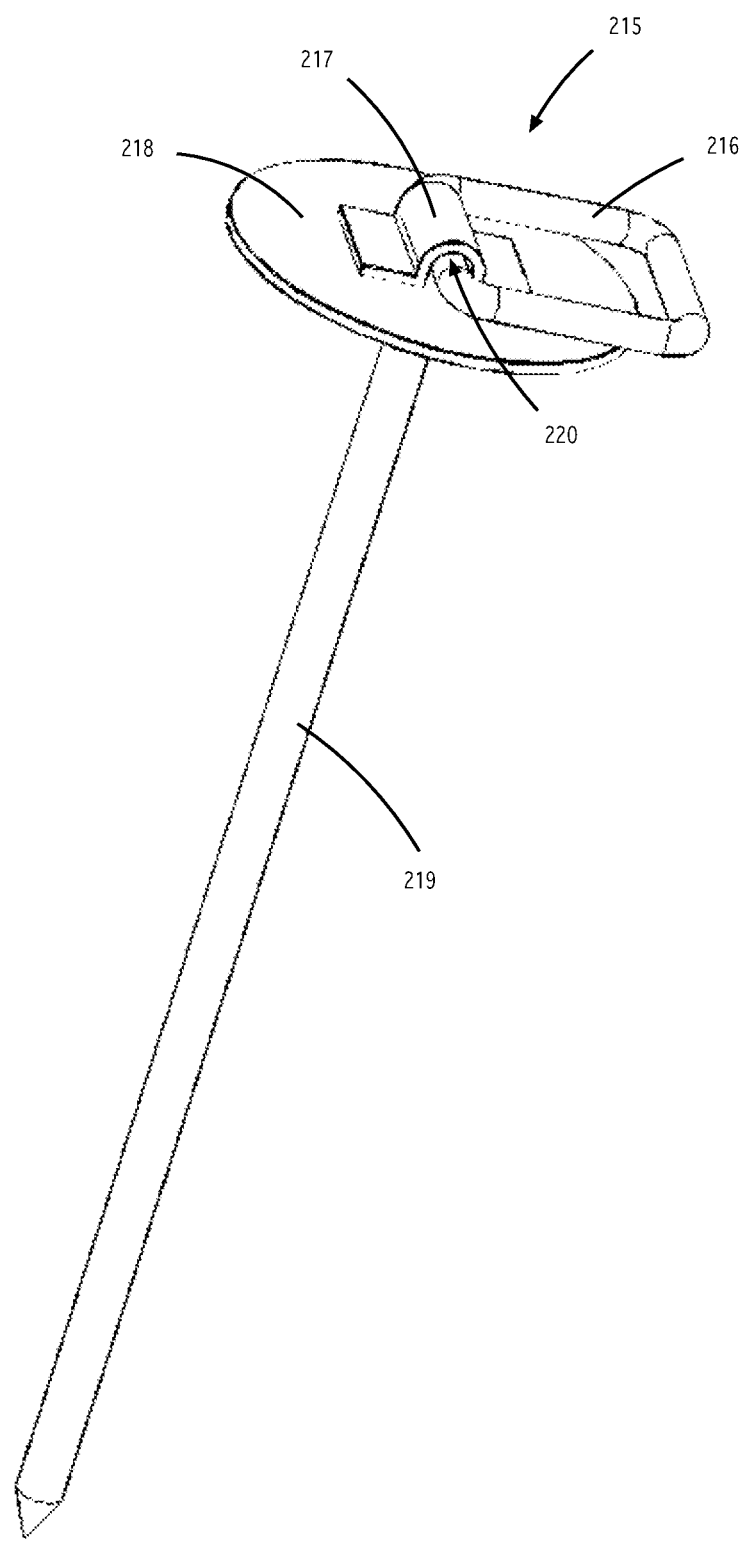
FIG. 4A illustrates a detailed perspective view of a fastener portion showing a ring, a ring holder, a plate and a pin portion, in accordance with an embodiment of the present invention.

FIG. 4A illustrates a detailed perspective view of a fastener portion (215) showing a ring (216), a ring holder (217), a plate (218) and a pin (219) portion.

The fastener portion holds a ground cover in place that is laid out over earth and/or soil at grade.

The ring holder is shown attached and connected to a round plate. A channel (220) configured at the center of the ring holder permits insertion of a portion of the ring, which allows the ring to swivel from a horizontal position to a vertical position.

In the horizontal position, the ring lays flat upon the plate to form less of an obstacle that may be tripped over after insertion of the fastener portion.

The fastener portion is installed may be pushed by hand or hammered with a tool through the ground cover and into the earth and/or soil below grade. The installation punctures the ground cover creating an opening that is covered by the fastener portion plate to prevent weed growth.

Swiveling the ring to the vertical portion, inserting one or two fingers through the ring and pulling the assembly up from the earth and/or soil by hand removes the fastener portion.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or mechanical system that those skilled in the art will readily know is suitable in light of the foregoing teachings. Thus, the present invention is not limited to any particular tangible means of implementation.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserve its right to later amend the present application to explicitly include citations to such documents and/or explicitly include the functionally corresponding structures, which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) and 35 USC § 111 (a) necessarily have a filing and/or publication date prior to that of the instant application, and thus are valid prior documents to incorporated by reference in the instant application.

Having fully described at least one embodiment of the present invention, other equivalent or alternative methods of growing an organism in an irrigation apparatus according to the present invention will be apparent to those skilled in the art. Various aspects of the invention have been described above by way of illustration, and the specific embodiments disclosed are not intended to limit the invention to the particular forms disclosed. The particular implementation of a top portion joined with a bottom portion to form a body portion with a liquid containment vessel, a body portion joined with a plant support, a body portion inserted through a slotted opening fashioned within a ground cover into an earthen cavity, one or more body portions connected to a liquid conduit may vary depending upon the particular context or application. By way of example, and not limitation, an array of body portions attached to a liquid conveyance conduit described in the foregoing were principally directed to the efficient use of space, liquid and nutrient to grow one or more plants over an undulating grade; however, similar techniques may instead be applied to hydroponic or aeroponics plant growing systems, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An irrigation apparatus, comprising: a body portion that comprises a top portion and a bottom portion that join to form a liquid containment vessel that disperses liquid via sets of outlets in a defined dispersal pattern through angled openings to at least one plant embedded in growth medium within an aperture configured at the center of said body portion, said body portion inserts at least partially within a cavity portion filled with a growth medium to grade, said liquid containment vessel is configured about an aperture at the center of said top portion, an inner sidewall configured about said aperture forms an inner wall of a liquid containment vessel cavity configured below said top portion, an outer sidewall configured about the circumference of said top portion forms an outer wall of said liquid containment vessel cavity, said liquid containment vessel cavity configured below said top portion forms a top section of said liquid containment vessel that is structured and arranged to join with a corresponding bottom section that is configured above said bottom portion, an inner stub wall configured about an aperture configured at the center of said bottom portion forms an inner wall of a liquid containment vessel cavity configured above said bottom portion, an outer stub wall configured about the circumference of said bottom portion forms an outer wall of said liquid containment vessel cavity, said liquid containment vessel cavity configured above said bottom portion forms said bottom section of the liquid containment vessel, said inner sidewall and said inner stub wall are configured to attach and connect to one another to create a liquid containment vessel inner cavity wall with a water tight seal and said outer sidewall and said outer stub wall are configured to attach and connect to one another to create a liquid containment vessel outer cavity wall with a water tight seal, said outer wall is configured with an inlet for attachment of a length of conduit tubing that connects to a length of flexible conduit that conveys liquid from an external source to the interior of said liquid containment vessel, a first wall configured about said bottom portion aperture forms a first slope of a funnel shaped aperture cavity disposed to insert into said growth medium that fills said cavity portion, said first slope is disposed to disperse said liquid from a partially sealed said liquid containment vessel, a curvature of said first slope directs a portion of said liquid dispersed from said liquid containment vessel to said at least one plant embedded in growth medium contained by said funnel shaped aperture cavity, a second wall connects said first wall to a third wall configured about the lower most edge of said second wall, said third wall forms a second slope of said funnel shaped aperture cavity, said curvature of said second slope directs a portion of said liquid dispersed by said first slope to the root of said at least one plant embedded in said growth medium contained by said funnel shaped aperture cavity, pluralities of tabs extend out from a periphery of said top portion sidewall for insertion of a plant support, an opening configured in each said tab permits insertion of a fastener or a leg of said plant support.

2. The irrigation apparatus as claimed in claim 1, wherein a gravity fed system conveys liquid to the liquid containment vessel.

3. The irrigation apparatus as claimed in claim 1, wherein said body portion joins with a container portion, said container portion a truncated cone having a sidewall and an open top and an open bottom, said container portion fills with a growth medium to grow said at least one plant, said body portion inserts into said open top imbedding at least partially in said growth medium contained by said container portion to surround said at least one plant, a cavity having an open top encompasses said open bottom, at least one opening configured about said open bottom drains liquid from said container portion into said cavity, a planar surface extends out horizontally from said cavity, pluralities of openings are spaced about said planar surface for insertion of a fastener used to secure said container portion in place, a vertical wall encompasses each said opening, a sloped wall configured about said planar surface perimeter adds structural integrity to said cavity, a planar flange extends into the interior of said open top at least partially, pluralities of protrusions are spaced about said planar flange to facilitate removal of one of said container portion from another of said container portion after insertion permitting economical shipment, at least one opening configured in said container portion sidewall permits insertion of said fastener and/or said leg of said support portion.

4. The irrigation apparatus as claimed in claim 3, wherein an adhesive applied to the underside of said cavity creates a watertight seal between said container portion and a substrate.

5. The irrigation apparatus as claimed in claim 1, wherein said liquid containment vessel is configured with a receptacle for attachment of a attachment fitting connectable to a conveyance hose or pipe, said attachment fitting comprising two ends; one said end configured for attachment to said receptacle, the other said end configured for attachment to and end of a hose or pipe, a washer is configured to be inserted into said hose or pipe end of said attachment fitting to prevent leakage of said conveyed liquid, a washer portion inserts into said receptacle end of said attachment fitting to prevent leakage of said conveyed liquid, said washer portion is configured for insertion of an internal pressure regulator, inserting said internal pressure regulator into a cavity configured within said washer portion holds said internal pressure regulator in place within said attachment fitting, an opening configured within said cavity permits insertion and pass through of an outlet that extends out from the body of said internal pressure regulator, the orientation of said outlet passes said liquid through to said interior of said liquid containment vessel which disperses said liquid through said openings to said at least one plant embedded in said growth medium at the center of said body portion, an inlet extends outward from said internal pressure regulator body, the orientation of said inlet gathers said liquid conveyed by said hose or pipe from an external source into said internal pressure regulator.

6. The irrigation apparatus as claimed in claim 1, wherein said plant support provides beneficial support for portions of said at least one plant, said plant portions are elevated above grade to grow in full sun and facilitate beneficial ambient air flow throughout said elevated plant portions, said plant support comprises a horizontal support portion connected to and elevated above a vertical tunnel portion, said at least one plant grows within the interior of said vertical tunnel portion that is configured to gather the early thick and heavy branching of said at least one plant growing inside said vertical tunnel portion, said vertical tunnel has an open top end and an open bottom end, said open top end of said vertical tunnel portion connects to an aperture configured at the center of said horizontal support portion, said aperture permits the pass through of the late thin light branching that propagates from said early thick heavy branching contained and constrained within said vertical tunnel portion, at least three legs are configured about the circumference of said open bottom end of said vertical tunnel portion for insertion into corresponding openings configured within said tabs that extend out from said outer sidewall of said top portion, said at least three legs of said plant support further imbed into growth medium encompassing the device securing both said plant support and said body portion in place preventing dislodgement from an imbalance in plant weight or removal from windblow, said horizontal support portion and said vertical tunnel portion are comprised of structural members spaced a distance apart, minimized spacing between said structural members of said vertical tunnel portion prevents penetration of said early thick and heavy branching through said tunnel portion, spacing between said structural members of said horizontal support portion permit ambient air flow throughout said elevated plant portions, a curved surface edge configured about the circumference of said horizontal support portion prevents damage to plant portions that hang down from the perimeter edge of said support portion.

7. The irrigation apparatus as claimed in claim 1, wherein said body portion has at least four tabs configured about a top portion perimeter for insertion of said plant support comprising four legs.

8. The irrigation apparatus as claimed in claim 1, wherein said inner sidewall and said inner stub wall are configured to attach and connect to one another to create a partial watertight seal.

9. The irrigation apparatus as claimed in claim 1, wherein said sets of outlets spaced about said inner sidewall are structured and arranged to disperse said liquid from said liquid containment vessel through said openings at an angle, pluralities of sets create a defined dispersal pattern to benefit said at least one plant growing within said body portion aperture and minimize erosion of said growth medium contained within said bottom portion funnel shaped aperture cavity.

10. The irrigation apparatus as claimed in claim 9, wherein each said set of said outlets comprises a first said opening angled at 22.5°, a second said opening angled at 90° and a third said opening angled at 45°.

11. The irrigation apparatus as claimed in claim 1, wherein said sets of said outlets are spaced about said inner stub wall, said openings of said outlets slope upward to disperse said liquid from said liquid containment vessel at an angle of at least 15° to said at least one plant growing at the center of said body portion.

12. The irrigation apparatus as claimed in claim 11, wherein said outer stub wall is configured with an inlet for attachment of a length of conduit tubing, said conduit tubing conveys said liquid to the interior of said liquid containment vessel.

13. The irrigation apparatus as claimed in claim 1, wherein the joining of said top portion with said bottom portion creates a flange about said body portion, said flange holds a ground cover in place at grade about said body portion, the liquid weight contained within said liquid containment vessel prevents removal of said body portion and said at least one plant from windblow.

14. The irrigation apparatus as claimed in claim 13, wherein a fastener portion holds said ground cover in place upon soil and/or earth at grade, said fastener comprising a ring, a ring holder, a plate and a pin portion, said ring holder holds said ring in place on top of said plate, a channel configured within said ring holder permits said ring to swivel to a degree above said plate, said pin portion connects vertically beneath said plate, said pin portion disposed to puncture said ground cover and insert into said earth and/or soil until said plate rests upon said ground cover, said plate covers said opening created by said puncture to prevent weed growth through said opening.

15. The irrigation apparatus as claimed in claim 14, wherein an opening is fashioned in said ground cover for insertion of said body portion, one or more slots configured about the circumference of said opening enables simple insertion and removal of said body portion and said at least one plant at the end of its growing cycle.

16. The irrigation apparatus as claimed in claim 1, wherein said body inserts into a cavity portion filled with nutrient, said cavity portion fashioned and shaped mechanically or by hand in earth and/or soil below grade.

17. The irrigation apparatus as claimed in claim 16, wherein said cavity portion is cone shaped.

18. The irrigation apparatus as claimed in claim 1, wherein said body portion is used to grow said at least one plant in a soilless environment using water-based solutions commonly utilized by hydroponic(s) or aeroponic(s) systems.

19. The irrigation apparatus as claimed in claim 1, wherein said body portion is connected to said flexible conduit that conveys said liquid from said external source, a pressure regulator inserted into said flexible conduit connects a said length of conduit tubing to said body portion inlet to supply said liquid to said liquid containment vessel, connecting pluralities of said conduit tubing to pluralities of said body portions creates an array of body portion irrigators to water pluralities of plants.

20. The irrigation apparatus as claimed in claim 19, wherein said array of body portion irrigators is geometrically linear.

21. The irrigation apparatus as claimed in claim 19, wherein said array of body portion irrigators is curved or circular.

22. The irrigation apparatus as claimed in claim 19, wherein said array of body portion irrigators is structured and arranged to form at least one letter, at least one number or at least one symbol.

23. The irrigation apparatus as claimed in claim 19, wherein said array of body portion irrigators form at least one concentric circle.

24. The irrigation apparatus as claimed in claim 19, wherein said array of body portion irrigators forms at least one spiral.

* * * * *